United States Patent
Hirota et al.

(10) Patent No.: US 11,799,372 B2
(45) Date of Patent: Oct. 24, 2023

(54) DRIVING APPARATUS AND DRIVING METHOD FOR SEMICONDUCTOR SWITCH, POWER CONVERSION APPARATUS, AND VEHICLE

(71) Applicant: SUMITOMO ELECTRIC INDUSTRIES, LTD., Osaka (JP)

(72) Inventors: Masayoshi Hirota, Osaka (JP); Keiji Tashiro, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 403 days.

(21) Appl. No.: 17/286,694

(22) PCT Filed: Jul. 24, 2019

(86) PCT No.: PCT/JP2019/028974
§ 371 (c)(1),
(2) Date: Apr. 19, 2021

(87) PCT Pub. No.: WO2020/100349
PCT Pub. Date: May 22, 2020

(65) Prior Publication Data
US 2021/0344268 A1 Nov. 4, 2021

(30) Foreign Application Priority Data

Nov. 12, 2018 (JP) .................. 2018-212158

(51) Int. Cl.
*H02M 1/08* (2006.01)
*B60L 53/20* (2019.01)
*H02M 3/335* (2006.01)
(52) U.S. Cl.
CPC ............... *H02M 1/08* (2013.01); *B60L 53/20* (2019.02); *H02M 3/33573* (2021.05); *B60L 2210/10* (2013.01)

(58) Field of Classification Search
CPC ...... G05F 1/00; G05F 1/10; G05F 1/12; G05F 1/46; G05F 1/455; G05F 1/45;
(Continued)

(56) References Cited

U.S. PATENT DOCUMENTS 6,178,099 B1 * 1/2001 Schutten ............. H02M 3/3376
363/17
8,344,764 B2 * 1/2013 Bayerer ............. H03K 17/0406
323/272
(Continued)

FOREIGN PATENT DOCUMENTS

JP 2015-012624 A 1/2015
JP 2016-012861 A 1/2016
(Continued)

*Primary Examiner* — Jeffrey A Gblende
(74) *Attorney, Agent, or Firm* — Oliff PLC

(57) ABSTRACT

A semiconductor switch driving apparatus is configured to drive a semiconductor switch, the semiconductor switch not having a body diode and having a threshold voltage for performing switching between off and on lower than a threshold voltage of a silicon device. The semiconductor switch driving apparatus includes: a first drive voltage switching circuit configured to switch a drive voltage of the semiconductor switch to a first adjustment voltage between an off-voltage and an on-voltage, at a predetermined time immediately before a timing at which the semiconductor switch is driven from off to on; and a second drive voltage switching circuit configured to switch, after the drive voltage of the semiconductor switch has been switched by the first drive voltage switching circuit, the drive voltage of the semiconductor switch to the on-voltage at the timing at which the semiconductor switch is driven from off to on.

16 Claims, 19 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H05B 39/048; B23K 11/24; H04B 2215/069

See application file for complete search history.

(56) References Cited

U.S. PATENT DOCUMENTS

| | | | |
|---|---|---|---|
| 9,667,171 B2* | 5/2017 | Hara | B60L 53/22 |
| 9,774,263 B1* | 9/2017 | Chen | H02M 7/217 |
| 2015/0381151 A1 | 12/2015 | Kimura | |
| 2016/0001665 A1* | 1/2016 | Kim | H02M 3/33573 |
| | | | 363/21.02 |
| 2017/0353111 A1 | 12/2017 | Elasser et al. | |

FOREIGN PATENT DOCUMENTS

| | | |
|---|---|---|
| JP | 2016-092884 A | 5/2016 |
| JP | 2017-221103 A | 12/2017 |

\* cited by examiner

DRIVING APPARATUS AND DRIVING METHOD FOR SEMICONDUCTOR SWITCH, POWER CONVERSION APPARATUS, AND VEHICLE

TECHNICAL FIELD

This disclosure relates to a driving apparatus and a driving method for a semiconductor switch, a power conversion apparatus, and a vehicle. This application claims priority on Japanese Patent Application No. 2018-212158 filed on Nov. 12, 2018, the entire content of which is incorporated herein by reference.

BACKGROUND ART

Electric vehicles (EVs), hybrid electric vehicles (HEVs), and plug-in hybrid electric vehicles (PHEVs) have installed therein a step-down DC/DC converter, serving as an insulated power conversion apparatus, for supplying power from a motor-driving high-voltage battery (e.g., 300 V) to a low-voltage battery (e.g., 12 V) or a low-voltage load. Conventionally, for a step-down DC/DC converter of this type, a silicon (Si) device (Si-MOSFET) has been used as a semiconductor switch. However, in recent years, in order to realize high efficiency and downsizing of the apparatus, installation of a GaN (gallium nitride) device has been considered.

The GaN device allows high-speed transfer of electrons, and thus, is advantageous in that efficient switching can be performed. Meanwhile, in the GaN device, since the threshold voltage is low, false turn-on easily occurs. Further, different from an ordinary transistor, the GaN device does not have a body diode and the source and drain thereof are in symmetry with each other. Therefore, the GaN device has a problem that loss is caused due to reverse conduction.

A proposal for solving this problem is provided in PATENT LITERATURE 1 below. The technology described in PATENT LITERATURE 1 relates to a drive circuit for a non-insulated chopper circuit. This circuit is a circuit in which two GaN devices connected in series between a power supply and a ground are alternately driven such that one of the two GaN devices is turned on and the other is turned off with a dead time therebetween. This circuit has a 3-voltage output circuit capable of outputting three levels of a positive voltage, zero voltage, and a negative voltage. In a period in which one GaN device (first GaN device) is on and the other GaN device (second GaN device) is off, a negative voltage is applied to the gate of the second GaN device. When the first GaN device is turned off and a dead period is started, the first GaN device performs reverse conduction. Therefore, during this period, the gate voltage of the first GaN device is caused to be zero voltage, to inhibit increase of loss due to the reverse conduction.

When the second GaN device is turned on upon the gate voltage thereof exceeding a threshold, a negative voltage is applied to the gate of the first GaN device. Accordingly, self-turning-off of the first GaN device is prevented.

Then, upon start of turning-off of the second GaN device, the drain-source voltage of the first GaN device changes, resulting in occurrence of self-turning-on. Therefore, a negative voltage is continuously applied to the gate of the first GaN device. However, when the negative voltage is continuously applied, loss due to the reverse conduction of the first GaN device is increased. Thus, when the gate voltage of the second GaN device has become lower than the threshold voltage, the gate voltage of the first GaN device is switched to a positive voltage.

Through this control, loss due to reverse conduction of the GaN device can be reduced while erroneous operation of the GaN device is prevented.

CITATION LIST

Patent Literature

PATENT LITERATURE 1: Japanese Laid-Open Patent Publication No. 2016-92884

SUMMARY OF INVENTION

Technical Problem

A semiconductor switch driving apparatus according to a first aspect of this disclosure is configured to drive a semiconductor switch, the semiconductor switch not having a body diode and having a threshold voltage for performing switching between off and on lower than a threshold voltage of a silicon device. The semiconductor switch driving apparatus includes: a first drive voltage switching circuit configured to switch a drive voltage of the semiconductor switch to a first adjustment voltage between an off-voltage and an on-voltage, at a predetermined time immediately before a timing at which the semiconductor switch is driven from off to on; and a second drive voltage switching circuit configured to switch, after the drive voltage of the semiconductor switch has been switched by the first drive voltage switching circuit, the drive voltage of the semiconductor switch to the on-voltage at the timing at which the semiconductor switch is driven from off to on.

A power conversion apparatus according to a second aspect of this disclosure is configured to output a power obtained by conversion of an inputted power through switching of a plurality of semiconductor switches. The power conversion apparatus includes: a power conversion circuit including a plurality of semiconductor switch elements, an inductance element, a transformer, and a capacitance element which are connected so as to realize the conversion; and the semiconductor switch driving apparatuses described above configured to drive at least one of the plurality of semiconductor switch elements of the power conversion circuit.

A semiconductor switch driving method according to a third aspect of this disclosure is a driving method for a semiconductor switch, the semiconductor switch not having a body diode and having a threshold voltage for performing switching between off and on lower than a threshold voltage of a silicon device. The driving method includes the steps of: switching a drive voltage of the semiconductor switch to a first adjustment voltage between an off-voltage and an on-voltage at a predetermined time immediately before a timing at which the semiconductor switch is driven from off to on; and switching, after the drive voltage of the semiconductor switch has been switched to the first adjustment voltage, the drive voltage of the semiconductor switch to the on-voltage at the timing at which the semiconductor switch is driven from off to on.

DESCRIPTION OF EMBODIMENTS

Figure 1:
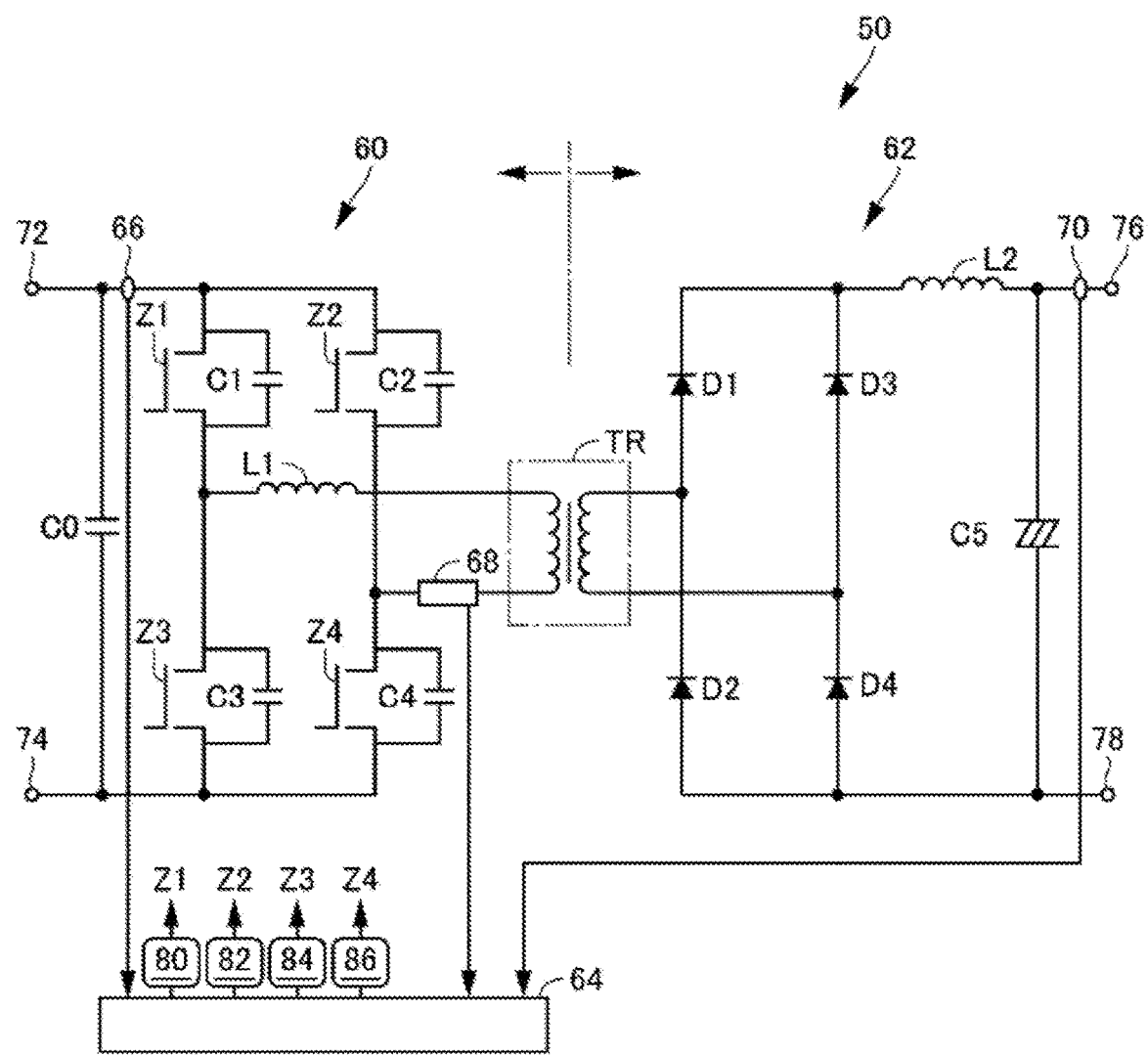
FIG. 1 is a circuit diagram of a DC/DC converter according to a first embodiment of this disclosure.

Description of Embodiments of the Present Invention

Problems to be Solved by the Disclosure

The technology described in PATENT LITERATURE 1 above relates to a non-insulated power conversion circuit. In an insulated power conversion circuit, in particular, in a power conversion circuit using a full bridge circuit, a parasitic capacitance to a GaN device, a drive current, and an induction current need to be taken into consideration. Thus, there is a problem that the technology disclosed in PATENT LITERATURE 1 is difficult to be directly applied to the insulated power conversion circuit. Recently, power conversion circuits are often used in vehicles and the like, and it is desired to solve such a problem.

Therefore, an object of this disclosure is to provide a driving apparatus and a driving method for a semiconductor switch, a power conversion apparatus, and a vehicle that enable an insulated power conversion circuit to efficiently operate.

In the description below and the drawings, the same components are denoted by the same reference signs. Therefore, detailed descriptions thereof are not repeated. At least some parts of the embodiments described below can be combined together as desired.

Preferable embodiments of this disclosure are listed below.

(1) A semiconductor switch driving apparatus according to a first aspect of this disclosure is configured to drive a semiconductor switch, the semiconductor switch not having a body diode and having a threshold voltage for performing switching between off and on lower than a threshold voltage of a silicon device. The semiconductor switch driving apparatus includes: a first drive voltage switching circuit configured to switch a drive voltage of the semiconductor switch to a first adjustment voltage between an off-voltage and an on-voltage, at a predetermined time immediately before a timing at which the semiconductor switch is driven from off to on; and a second drive voltage switching circuit configured to switch, after the drive voltage of the semiconductor switch has been switched by the first drive voltage switching circuit, the drive voltage of the semiconductor switch to the on-voltage at the timing at which the semiconductor switch is driven from off to on.

At the timing at which the semiconductor switch is driven from off to on, the semiconductor switch performs reverse conduction. During the period of this reverse conduction, the drive voltage of the semiconductor switch is switched to the first adjustment voltage between the off-voltage and the on-voltage by the first drive voltage switching circuit. Then, the drive voltage of the semiconductor switch is switched to the on-voltage by the second drive voltage switching circuit. Since the potential difference between two terminals during the reverse conduction is reduced, loss associated with the reverse conduction can be reduced.

(2) Preferably, the off-voltage is a negative voltage, the on-voltage is a positive voltage, and the first adjustment voltage is higher than the off-voltage and not higher than the threshold voltage.

When the threshold of the semiconductor switch is low, the drive voltage needs to be a negative voltage in order to cause the semiconductor switch to be off. When the semiconductor switch performs reverse conduction while the drive voltage is off, loss is increased. Therefore, by switching the drive voltage at this time to a first adjustment voltage higher than the negative voltage and lower than the threshold voltage, it is possible to reduce loss during the reverse conduction.

(3) More preferably, the first adjustment voltage is zero voltage. Loss during the reverse conduction by the semiconductor switch can be easily reduced by setting the first adjustment voltage to zero voltage.

(4) Further preferably, the semiconductor switch is a semiconductor switch forming a phase shift full-bridge circuit. In a phase shift full-bridge circuit, switching needs to be performed with the phases of the drive voltages of four semiconductor switches shifted. Loss associated with the reverse conduction of the semiconductor switch in the phase shift full-bridge circuit can be reduced by switching the drive voltage in the manner as described above in any of these semiconductor switches.

(5) Preferably, the phase shift full-bridge circuit includes four of the semiconductor switches, and the semiconductor switch driving apparatus drives each of the four semiconductor switches.

Loss associated with reverse conduction by the semiconductor switch in the phase shift full-bridge circuit can be efficiently reduced by switching the drive voltages in the manner as described above in all of the semiconductor switches.

(6) More preferably, the semiconductor switch driving apparatus further includes a third drive voltage switching circuit configured to switch, after the predetermined time and before the timing at which the semiconductor switch is driven from off to on, the drive voltage of the semiconductor switch to a second adjustment voltage higher than the first adjustment voltage and lower than the on-voltage.

Loss during the reverse conduction by the semiconductor switch can be reduced also by changing, during the reverse conduction, the drive voltage to an adjustment voltage of a step-like-shape in a plurality of stages.

(7) Further preferably, the semiconductor switch is a gallium nitride (GaN) switch.

In the GaN switch, the drive voltage during off is a negative voltage, the drive voltage during on is a positive voltage, and in addition, the threshold voltage is small. Therefore, the reverse conduction described above easily occurs. By using the adjustment voltage, it is possible to efficiency reduce loss during the reverse conduction.

(8) A semiconductor switch driving apparatus according to a second aspect of this disclosure is configured to drive a semiconductor switch, the semiconductor switch not having a body diode and having a threshold voltage for performing switching between off and on lower than a threshold voltage of a silicon device. The semiconductor switch driving apparatus includes: a first drive voltage switching circuit configured to switch a drive voltage of the semiconductor switch to a first adjustment voltage between an off-voltage and an on-voltage, after a lapse of a predetermined time period after the semiconductor switch has been turned off until a timing at which the semiconductor switch is next driven to be on; and a second drive voltage switching circuit configured to switch, after the drive voltage of the semiconductor switch has been switched by the first drive voltage switching circuit, the drive voltage of the semiconductor switch to the on-voltage at the timing at which the semiconductor switch is driven to be on.

At the timing at which the semiconductor switch is driven from off to on, the semiconductor switch performs reverse conduction. In a period after a predetermined time period after the semiconductor switch has been turned off until the timing at which the semiconductor switch is driven to be on, the first drive voltage switching circuit switches the drive voltage of the semiconductor switch to the first adjustment voltage between the off-voltage and the on-voltage. Then, the second drive voltage switching circuit switches the drive voltage of the semiconductor switch to the on-voltage. Since the potential difference between two terminals during the reverse conduction is reduced, loss associated with the reverse conduction can be reduced.

(9) A power conversion apparatus according to a third aspect of this disclosure is configured to output a power obtained by conversion of an inputted power through switching of a plurality of semiconductor switches. The power conversion apparatus includes: a power conversion circuit including a plurality of semiconductor switch elements, an inductance element, a transformer, and a capacitance element which are connected so as to realize the conversion; and any one of the semiconductor switch driving apparatuses described above configured to drive at least one of the plurality of semiconductor switch elements of the power conversion circuit.

At the timing at which the semiconductor switch is driven from off to on, the semiconductor switch performs reverse conduction. During the period of this reverse conduction, the drive voltage of the semiconductor switch is switched to the first adjustment voltage between the off-voltage and the on-voltage by the first drive voltage switching circuit. Then, the drive voltage of the semiconductor switch is switched to the on-voltage by the second drive voltage switching circuit. Since the potential difference between two terminals during the reverse conduction is reduced, loss associated with the reverse conduction can be reduced.

(10) A semiconductor switch driving method according to a fourth aspect of this disclosure is a driving method for a semiconductor switch, the semiconductor switch not having a body diode and having a threshold voltage for performing switching between off and on lower than a threshold voltage of a silicon device. The driving method includes the steps of: switching a drive voltage of the semiconductor switch to a first adjustment voltage between an off-voltage and an on-voltage at a predetermined time immediately before a timing at which the semiconductor switch is driven from off to on; and switching, after the drive voltage of the semiconductor switch has been switched to the first adjustment voltage, the drive voltage of the semiconductor switch to the on-voltage at the timing at which the semiconductor switch is driven from off to on.

At the timing at which the semiconductor switch is driven from off to on, the semiconductor switch performs reverse conduction. During the period of this reverse conduction, the drive voltage of the semiconductor switch is switched to the first adjustment voltage between the off-voltage and the on-voltage by the first drive voltage switching circuit. Then, the drive voltage of the semiconductor switch is switched to the on-voltage by the second drive voltage switching circuit. Since the potential difference between two terminals during the reverse conduction is reduced, loss associated with the reverse conduction can be reduced.

(11) A vehicle according to a fifth aspect of this disclosure includes: a vehicle body; a battery provided to the vehicle body and configured to store power at a first voltage and output the power; a low-voltage operation unit provided to the vehicle body and configured to operate at a second voltage lower than the first voltage; and the power conversion apparatus according to the third aspect above provided to the vehicle body and configured to receive the output of the battery as an input, convert the output so as to have the second voltage, and supply the resultant output to the low-voltage operation unit.

The power conversion apparatus according to the third aspect steps down the output of the battery from the first voltage to the second voltage, and supplies the resultant output to the low-voltage operation unit. Since power loss occurring in the power conversion apparatus is reduced, the low-voltage operation unit can be operated efficiently in this vehicle by using the power stored in the battery.

[Effect of Disclosure]

According to this disclosure, it is possible to provide a driving apparatus and a driving method for a semiconductor switch, a power conversion apparatus, and a vehicle that enable an insulated power conversion circuit to efficiently operate.

[Details of embodiments of the present disclosure]

Hereinafter, specific examples of a driving apparatus, a driving method for a semiconductor switch, a power conversion apparatus, and a vehicle according to embodiments of this disclosure will be described with reference to the drawings. This disclosure is not limited to these examples, is defined by the scope of the claims, and is intended to include meaning equivalent to the scope of the claims and all modifications within the scope.

First Embodiment

[Configuration] FIG. 1 is a circuit diagram of a phase shift full-bridge DC/DC converter 50 according to a first embodiment of this disclosure. With reference to FIG. 1, the phase shift full-bridge DC/DC converter 50 includes: a transformer TR; a primary-side portion 60 and a secondary-side portion 62 arranged with the transformer TR therebetween; a controller 64 which performs drive control of four GaN devices (GaN-HEMTs) forming the primary-side portion 60; and 3-voltage output circuits 80, 82, 84, and 86 controlled by the controller 64 and for controlling gate voltages of the four GaN-HEMTs, the 3-voltage output circuits 80, 82, 84, and 86 each implemented by a pulse transformer capable of outputting a voltage with three voltages of a negative voltage, a positive voltage, and zero voltage switched.

The zero voltage here refers to a voltage that provides a potential that serves as a reference. The negative voltage refers to a voltage at which the potential difference relative to zero voltage becomes negative. The positive voltage refers to, converse to the negative voltage, a voltage at which the potential difference relative to zero voltage becomes positive. V (volt) is used as the unit for voltage, and generally, zero voltage is represented as 0 V or the like.

In the GaN-HEMT, the threshold voltage is low and the off-voltage is a negative voltage, and thus, the GaN-HEMT is suitable for this disclosure. However, as described above, the GaN-HEMT does not have a body diode and the source and drain thereof are in symmetry with each other, and thus, the GaN-HEMT has a problem that loss is caused due to reverse conduction. In the embodiments below, this problem is solved by devising switching of the voltage of a signal that drives the GaN-HEMT.

The primary-side portion 60 includes: two input terminals 72 and 74 to which a high DC voltage (e.g., 48 to 300 V) is applied; a capacitor C0 connected between the input terminals 72 and 74; GaN-HEMTs Z1 and Z3 connected in series between the input terminal 72 and the input terminal 74 so as to be parallel to the capacitor C0; and GaN-HEMTs Z2 and Z4 connected in series similarly between the input terminal 72 and the input terminal 74 so as to be parallel to the capacitor C0, and the GaN-HEMT Z1 and the GaN-HEMT Z3. The sources of each of the GaN-HEMT Z1 and the GaN-HEMT Z2 are connected to the input terminal 72. The drains of the GaN-HEMT Z3 and the GaN-HEMT Z4 are connected to the input terminal 74. The drain of the GaN-HEMT Z1 and the source of the GaN-HEMT Z3 are connected to each other. Similarly, the drain of the GaN-HEMT Z2 and the source of the GaN-HEMT Z4 are connected to each other. In the description below, the GaN-HEMT Z1 will be simply written as Z1 for simplification of the description. The same applies to Z2, Z3, and Z4.

The contact between Z1 and Z3 is connected to one terminal of a primary-side wire of the transformer TR, and the other terminal of the primary-side wire of the transformer TR is connected to the contact between Z2 and Z4. It is assumed that, as shown in FIG. 1, a primary-side leakage inductance L1 of the transformer TR is connected in series between the primary-side wire and the contact of Z1 and Z3.

Parasitic capacitances C1, C2, C3, and C4 are present between the sources and the drains of Z1, Z2, Z3, and Z4, respectively. For simplification of description, the parasitic capacitance C1 will be simply written as C1. The same applies to C2, C3, and C4, the capacitor C0 described above, and an electrolytic capacitor C5 described later.

The secondary-side portion 62 includes: four diodes D1, D2, D3, and D4 connected so as to extract a DC voltage (e.g., 12 V) obtained through stepping-down from a secondary-side wire of the transformer TR, to output terminals 76 and 78; and an electrolytic capacitor C5 connected between the output terminals 76 and 78. It is assumed that a leakage inductance L2 of the secondary-side wire of the transformer TR is connected in series between cathodes of the diode D1 and D3 and the output terminal 76.

The phase shift full-bridge DC/DC converter 50 further includes: a voltage sensor 66 between the input terminals 72 and 74; a voltage sensor 70 between the output terminals 76 and 78; and a current sensor 68 which measures a current flowing in the primary-side wire. The voltage sensor 66, the voltage sensor 70, and the current sensor 68 are used by the controller 64 for determining a timing of switching of drive voltages of Z1, Z2, Z3, and Z4.

<Conventional Driving Method>

Figure 2:
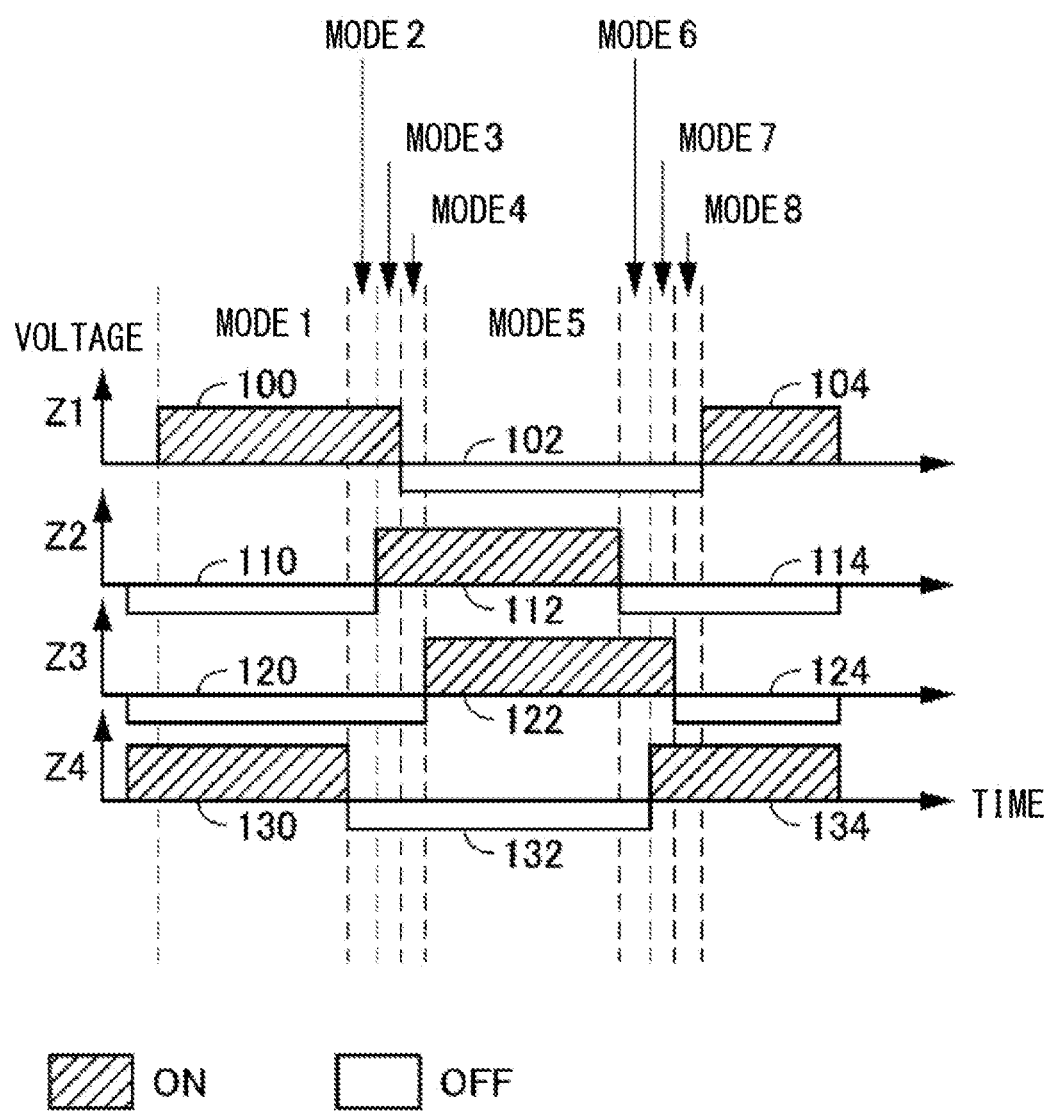
FIG. 2 shows, in time series, change in the gate voltage of each GaN device in a conventional DC/DC converter.

FIG. 2 shows, together with the operation mode, change in the drive voltages of Z1, Z2, Z3, and Z4 in a conventional phase shift full-bridge DC/DC converter having the primary-side portion 60 and the secondary-side portion 62 shown in FIG. 1. With reference to FIG. 2, the operation mode of the conventional phase shift full-bridge DC/DC converter includes modes 1 to 8.

In mode 1, as indicated by drive voltage waveforms 100 and 130, the drive voltages of Z1 and Z4 each become a positive voltage not less than a threshold, and Z1 and Z4 are turned on. Meanwhile, as indicated by drive voltage waveforms 110 and 120, the drive voltages of Z2 and Z3 are negative voltages, and Z2 and Z3 are off. At the end of mode 1, as indicated by a drive voltage waveform 132, the drive voltage of Z4 is switched to a negative voltage, and Z4 is turned off.

In mode 2, the drive voltage of Z1 is maintained at the positive voltage, and Z1 is on. The drive voltage of Z4 becomes a negative voltage, and Z4 is off. Z2 and Z3 remain off. At the end of mode 2, as indicated by the drive voltage waveform 110, the drive voltage of Z2 is switched to a positive voltage, and Z2 is turned on.

In mode 3, as indicated by the drive voltage waveforms 100 and 112, the drive voltages of Z1 and Z2 are positive voltages, and both of Z1 and Z2 are on. Z3 and Z4 remain off. At the end of mode 3, the drive voltage of Z1 becomes a negative voltage as indicated by a drive voltage waveform 102, and Z1 is turned off.

In mode 4, Z1, Z3, and Z4 are off, and only Z2 is on. That is, the gate voltages of Z1, Z3, and Z4 are negative voltages as indicated by the drive voltage waveforms 102, 120, and 132, and the gate voltage of Z2 is a positive voltage as indicated by the drive voltage waveform 112. At the end of mode 4, the drive voltage of Z3 is switched to a positive voltage as indicated by a drive voltage waveform 122, and Z3 is turned on.

In mode 5, Z1 and Z4 are off and Z2 and Z3 are on. At the end of mode 5, the drive voltage of Z2 is switched to a negative voltage as indicated by a drive voltage waveform 114, and Z2 is turned off.

In mode 6, Z1, Z2, and Z4 are off, and only Z3 is on. At the end of mode 6, the drive voltage of Z4 is switched to a positive voltage as indicated by a drive voltage waveform 134, and Z4 is turned on.

In mode 7, Z1 and Z2 are off, and Z3 and Z4 are on. At the end of mode 7, the drive voltage of Z3 is switched to a negative voltage as indicated by a drive voltage waveform 124, and Z3 is turned off.

In mode 8, Z1, Z2, and Z3, are off, and only Z4 is on. At the end of mode 8, the drive voltage of Z1 is switched to a positive voltage as indicated by a drive voltage waveform 104, and Z1 is turned on. As a result, after mode 8, the state is returned to that of mode 1 in which Z1 and Z4 are on and Z2 and Z3 are off.

<Driving Method of this Embodiment>

Figure 3:
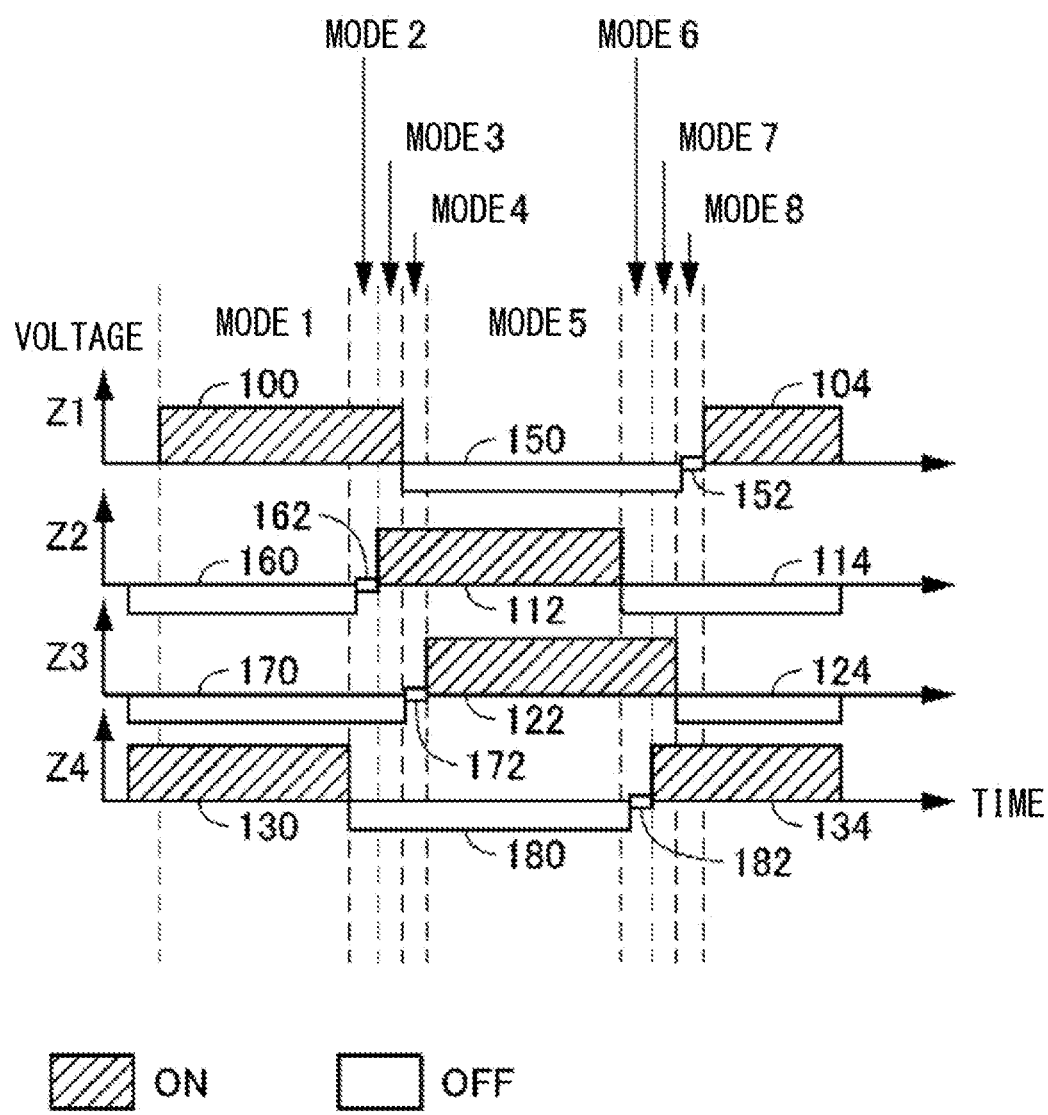
FIG. 3 shows, in time series, change in the gate voltage of each GaN device in a DC/DC converter according to the first embodiment of this disclosure.

FIG. 3 shows drive voltages of Z1, Z2, Z3, and Z4 when the phase shift full-bridge DC/DC converter 50 shown in FIG. 1 is driven according to this embodiment.

<<Mode 1>>

The drive voltages of Z1, Z2, Z3, and Z4 in mode 1 are the same as those in the conventional art. That is, as indicated by the drive voltage waveforms 100 and 130, the gate voltages of Z1 and Z4 are positive voltages, and Z1 and Z4 are on. Meanwhile, as indicated by drive voltage waveforms 160 and 170, the drive voltages of Z2 and Z3 are negative voltages, and Z2 and Z3 are off.

Figure 4:
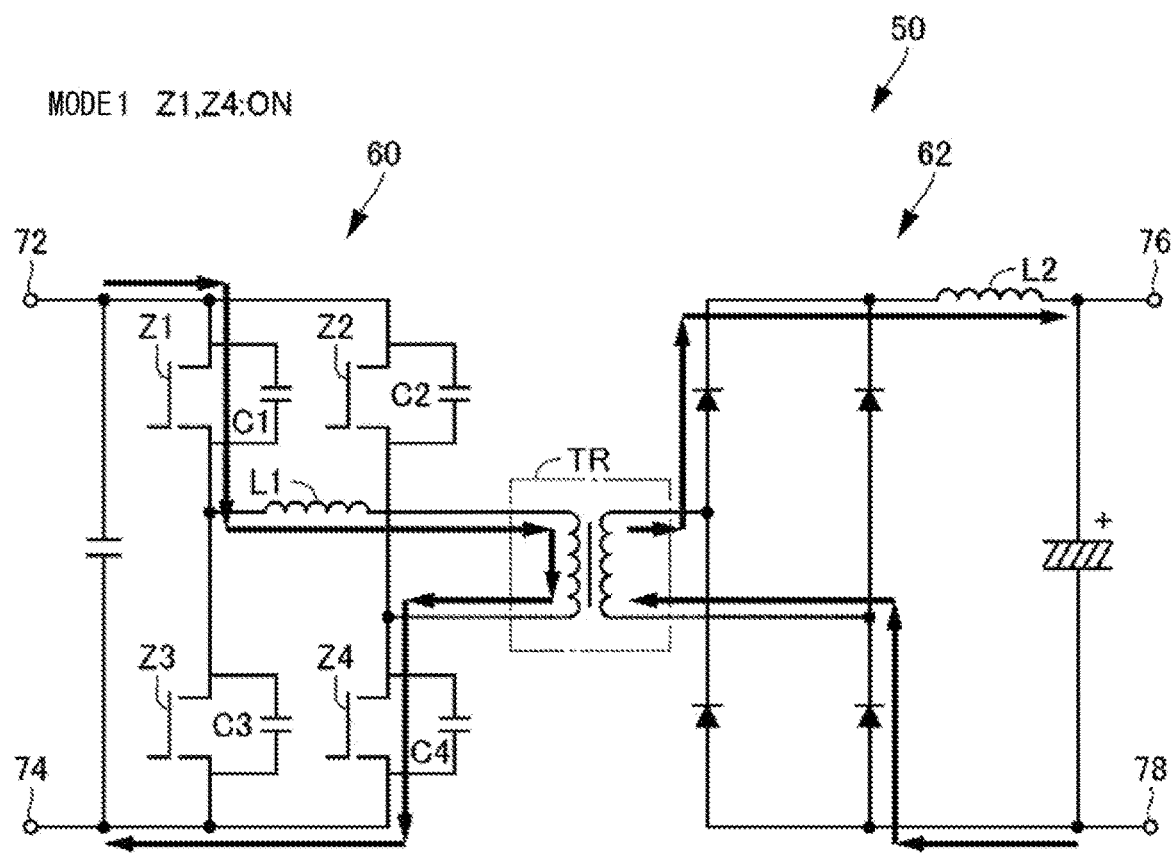
FIG. 4 shows the flow of a current in mode 1 in the DC/DC converter according to the first embodiment of this disclosure.

FIG. 4 shows the flow of a current at this time. With reference to FIG. 4, in mode 1, the current flows through a path of the input terminal 72→Z1→L1→the primary-side wire of TR→Z4→the input terminal 74. The current is flowing in the primary-side wire of the transformer TR. At this time, C2 has been charged. At the end of mode 1, Z4 is turned off.

<<Mode 2>>

Figure 5:
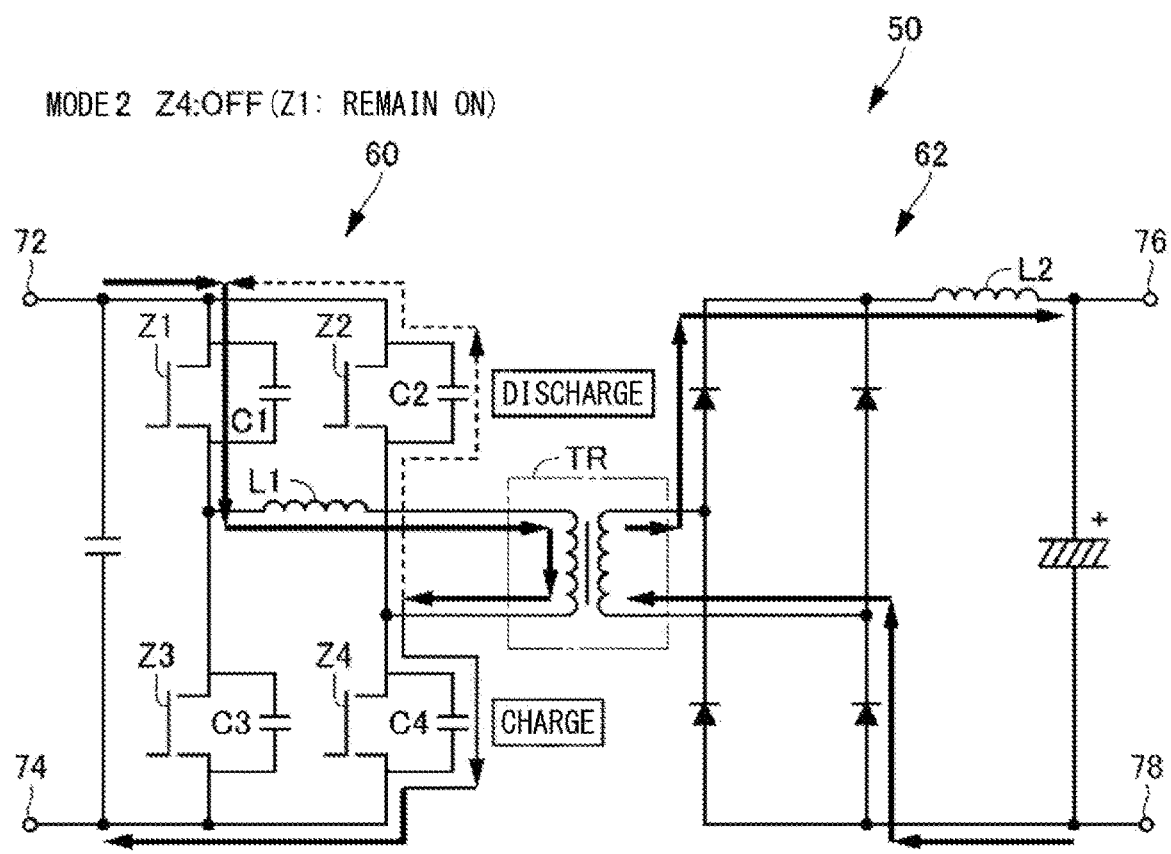
FIG. 5 shows the flow of a current in mode 2 in the DC/DC converter according to the first embodiment of this disclosure.

With reference back to FIG. 3, at the beginning of mode 2, Z1 remains on, but Z2, Z3, and Z4 are off. FIG. 5 shows the current path at this time.

With reference to FIG. 5, in order to maintain the current flowing in the primary-side wire of the transformer TR, C2 is discharged and C4 is charged. As a result, the current flows from the input terminal 72, through Z1, L1, and the primary-side wire of the transformer TR to reach the source of Z4, charges C4, and reaches the input terminal 74. Upon completion of the discharging of C2, the operation mode enters mode 2'.

<<Mode 2'>>

Figure 6:
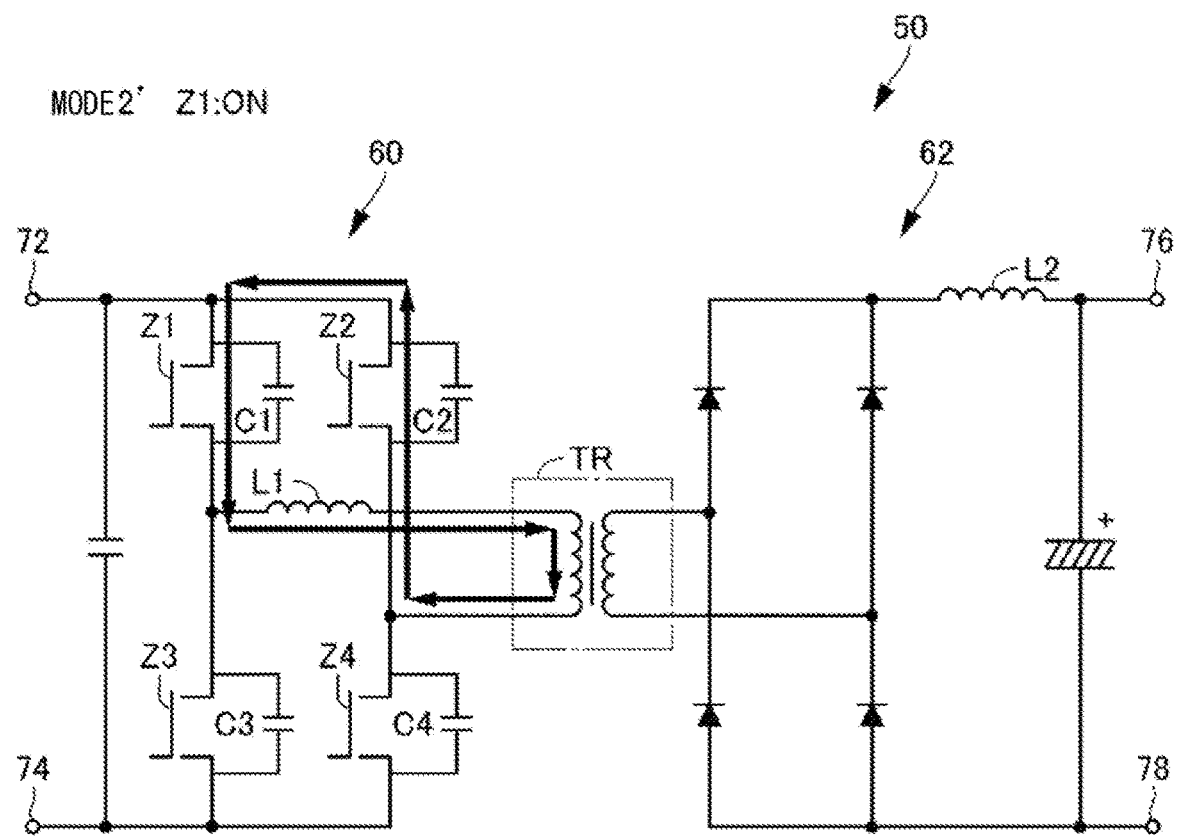
FIG. 6 shows the flow of a current in mode 2' in the DC/DC converter according to the first embodiment of this disclosure.

With reference to FIG. 6, after the discharging of C2, Z2 performs reverse conduction in mode 2', and the current flows through a path of Z1→L1→the primary-side wire of the transformer TR→Z2. At this time, as indicated by a drive voltage waveform 162 in FIG. 3, after the drive voltage of Z2 has once become zero voltage from a negative voltage, the drive voltage of Z2 becomes a positive voltage at the end of mode 2 as indicated by the drive voltage waveform 112. As a result, the potential difference between the source and the drain of Z2 during the reverse conduction by Z2 is reduced when compared with that during application of a negative drive voltage to Z2, and loss due to the reverse conduction is reduced.

<<Mode 3>>

Figure 7:
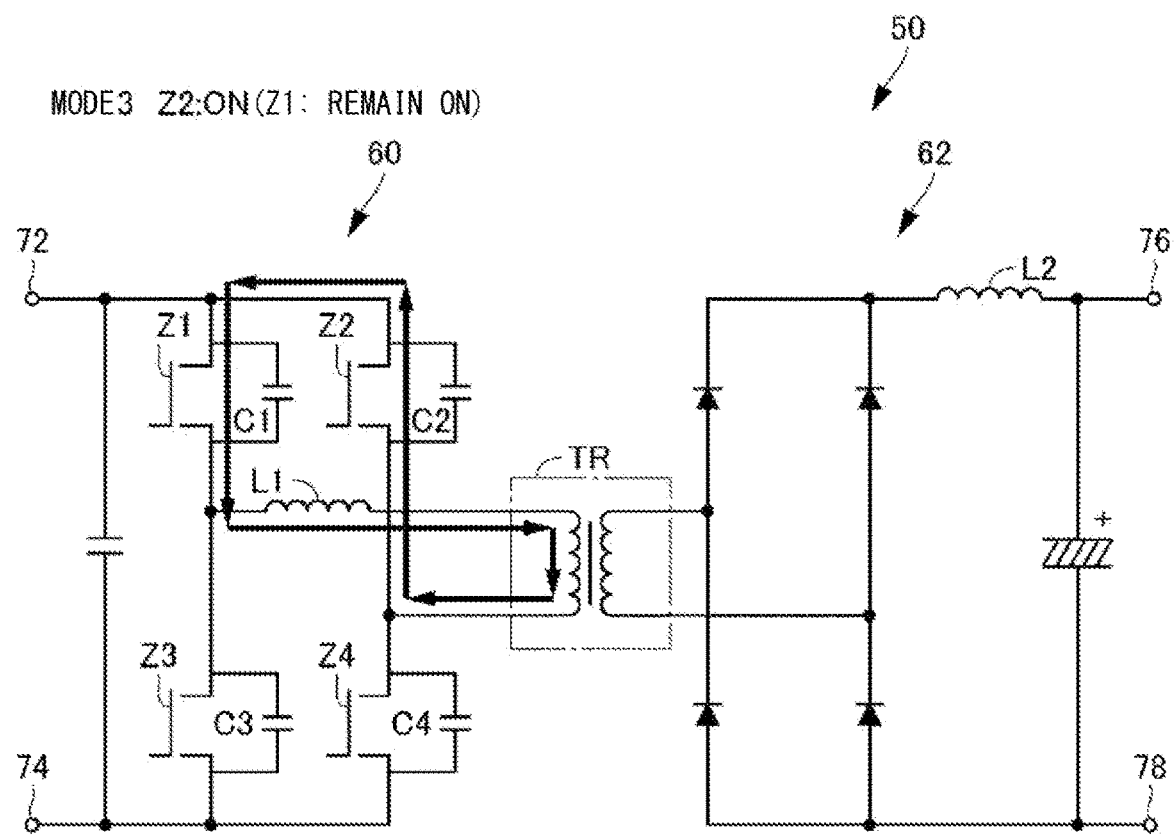
FIG. 7 shows the flow of a current in mode 3 in the DC/DC converter according to the first embodiment of this disclosure.

In mode 3, Z1 and Z2 are on, and Z3 and Z4 are off. This is the same as in the conventional art. FIG. 7 shows the current path in mode 3. With reference to FIG. 7, the current at this time flows through a path of Z1→L1→the primary-side wire of the transformer TR→Z2→Z1. At the end of mode 3, the drive voltage of Z1 is switched to a negative voltage as indicated by the drive voltage waveform 100, and Z1 is turned off.

<<Mode 4>>

Figure 8:
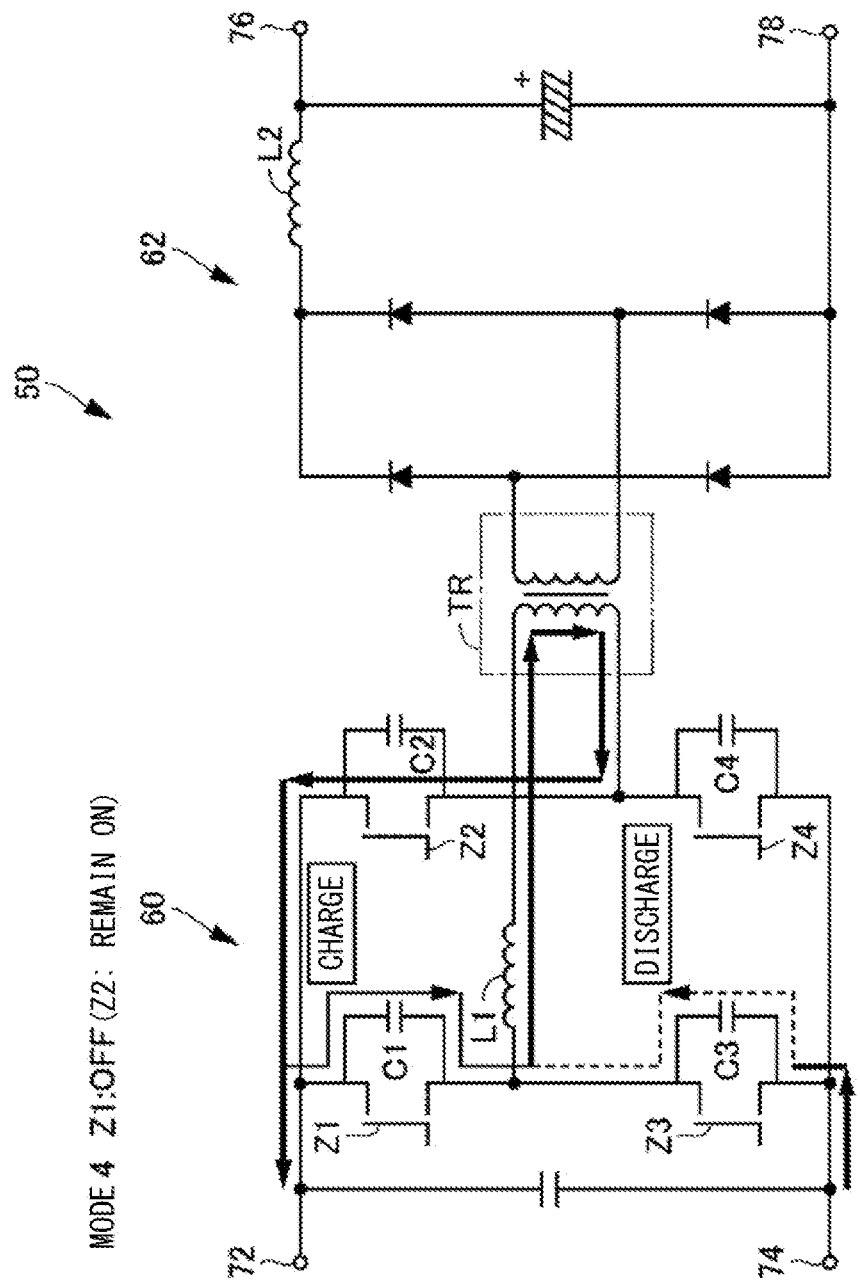
FIG. 8 shows the flow of a current in mode 4 in the DC/DC converter according to the first embodiment of this disclosure.

At the beginning of mode 4, Z1 is off, Z2 is on, and Z3 and Z4 are off. FIG. 8 shows the current path at this time. With reference to FIG. 8, in order to maintain the current flowing in the primary-side wire, C3 is discharged and C1 is charged, whereby the current flows through a path of the drain of Z1→L1→the primary-side wire of the transformer TR→Z2→the input terminal 72. After the discharging of C3, Z3 performs reverse conduction and a current flows in Z3. At this time, the drive voltage of Z3 is changed from the negative voltage to zero voltage as indicated by a drive voltage waveform 172. Accordingly, the operation mode enters mode 4'.

<<Mode 4'>>

Figure 9:
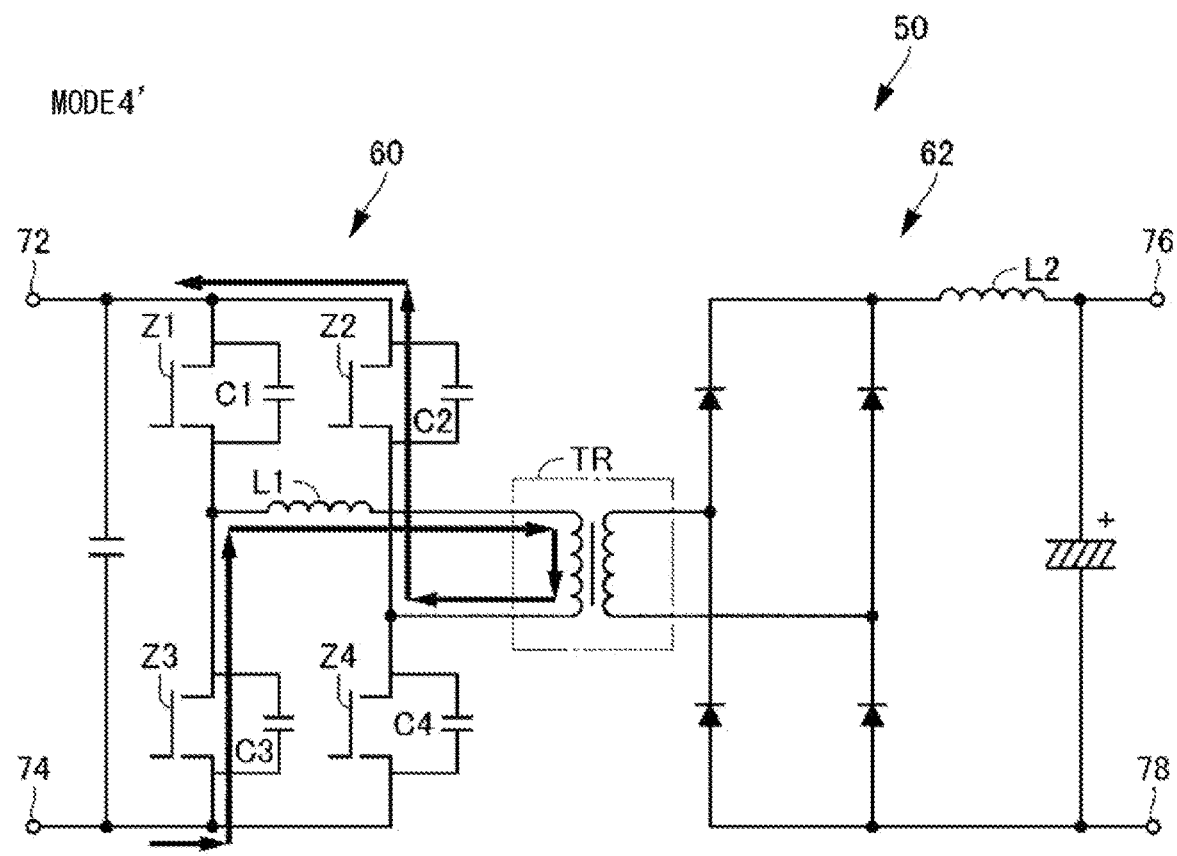
FIG. 9 shows the flow of a current in mode 4' in the DC/DC converter according to the first embodiment of this disclosure.

In mode 4', the drive voltage of Z3 becomes zero voltage. Since the absolute value of the source-drain voltage is reduced, loss due to the reverse conduction by Z3 can be reduced. FIG. 9 shows the current path in mode 4'. Since the current is flowing in Z3, the current flows in a direction of the input terminal 74→Z3→L1→the primary-side wire of the transformer TR→Z2→the input terminal 72. At the end of mode 4', the drive voltage of Z3 becomes a positive voltage as indicated by the drive voltage waveform 122 in FIG. 3.

<<Mode 5>>

Figure 10:
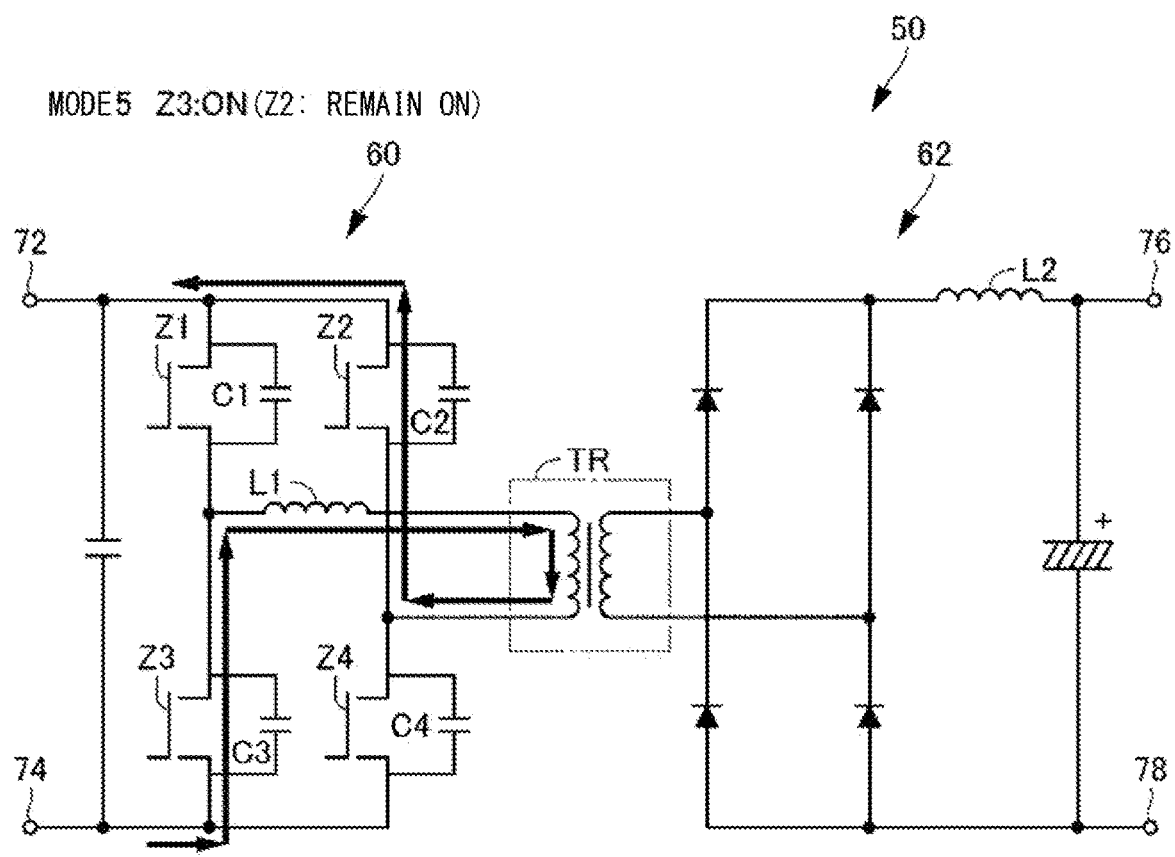
FIG. 10 shows the flow of a current in mode 5 in the DC/DC converter according to the first embodiment of this disclosure.
Figure 11:
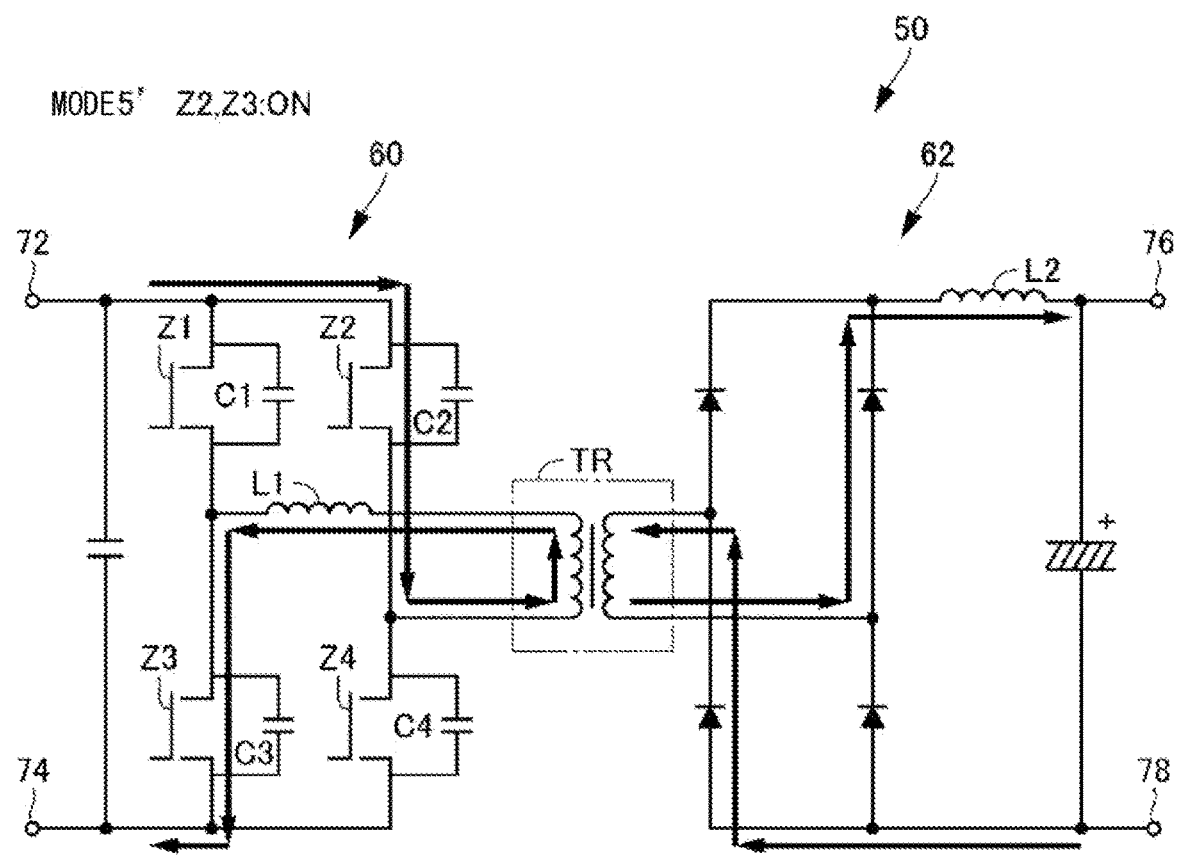
FIG. 11 shows the flow of a current in mode 5' in the DC/DC converter according to the first embodiment of this disclosure.

In the subsequent mode 5, Z1 and Z4 are off, and Z2 and Z3 are on. This is the same as in mode 5 in the conventional art. FIG. 10 shows the current path in mode 5. With reference to FIG. 10, in mode 5, the current flows through a path of the input terminal 74→Z3→L1→the primary-side wire of the transformer TR→Z2→the input terminal 72. In this case, a voltage in a direction reverse to the direction of the current is applied to the primary-side wire of the transformer TR. Therefore, the current shown in FIG. 10 is quickly reduced, and the direction of the current is reversed in the same path as shown in FIG. 11. This is defined as mode 5'. At the end of mode 5 (mode 5'), the drive voltage of Z2 becomes a negative voltage as indicated by the drive voltage waveform 114 in FIG. 3, and Z2 is turned off.

<<Mode 6>>

Figure 12:
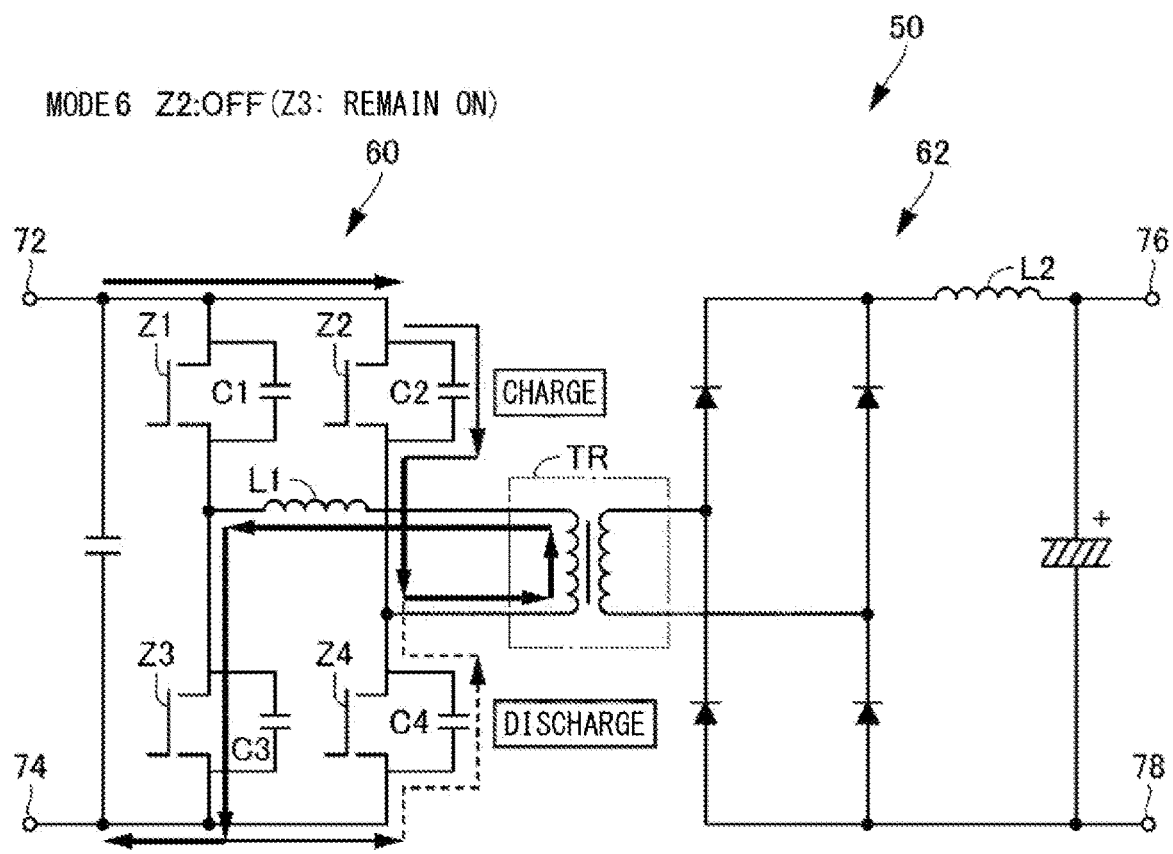
FIG. 12 shows the flow of a current in mode 6 in the DC/DC converter according to the first embodiment of this disclosure.

With reference to FIG. 12, in mode 6, as seen from the drive voltage waveforms 150, 114, 122, and 180 in FIG. 3, Z1, Z2, and Z4 are off, and Z3 is on. In order to maintain the current flowing in the primary-side wire of the transformer TR, the current passes through a path of the input terminal 72→C2→the primary-side wire of the transformer TR→L1→Z3→the input terminal 74, charges C2, and discharges C4. At the time point of completion of the discharging of C4, Z4 performs reverse conduction. At this time, the gate voltage of Z4 is switched to zero voltage as indicated by a drive voltage waveform 182 in FIG. 3. Accordingly, the operation mode enters operation mode 6'.

<<Mode 6'>>

Figure 13:
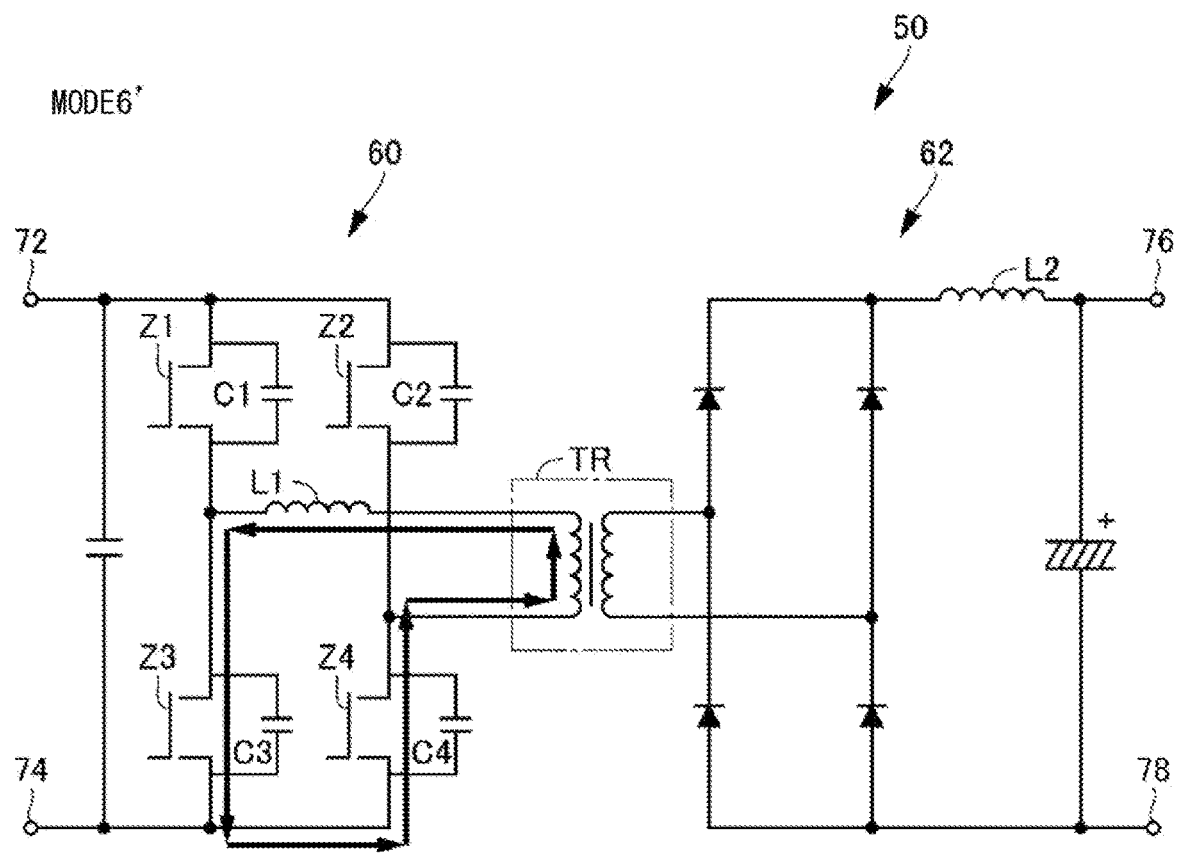
FIG. 13 shows the flow of a current in mode 6' in the DC/DC converter according to the first embodiment of this disclosure.

With reference to FIG. 13, in mode 6', Z1 and Z2 are off, Z3 is on, and Z4 is performing reverse conduction. The current flows through a path of Z4→the primary-side wire of the transformer TR→L1→Z3. In mode 6', the gate voltage of Z4 is zero voltage. Therefore, loss due to the reverse conduction by Z4 can be reduced. At the end of mode 6' (mode 6), the gate voltage of Z4 becomes a positive voltage as indicated by the drive voltage waveform 134 in FIG. 3, Z4 is turned on, and the operation mode enters mode 7.

<<Mode 7>>

With reference to FIG. 3, in mode 7, the gate voltages of Z1 and Z2 are negative voltages and the gate voltages of Z3 and Z4 are positive voltages as indicated by the drive voltage waveforms 150, 114, 122, and 134. Therefore, Z1 and Z2 are off, and Z3 and Z4 are on.

Figure 14:
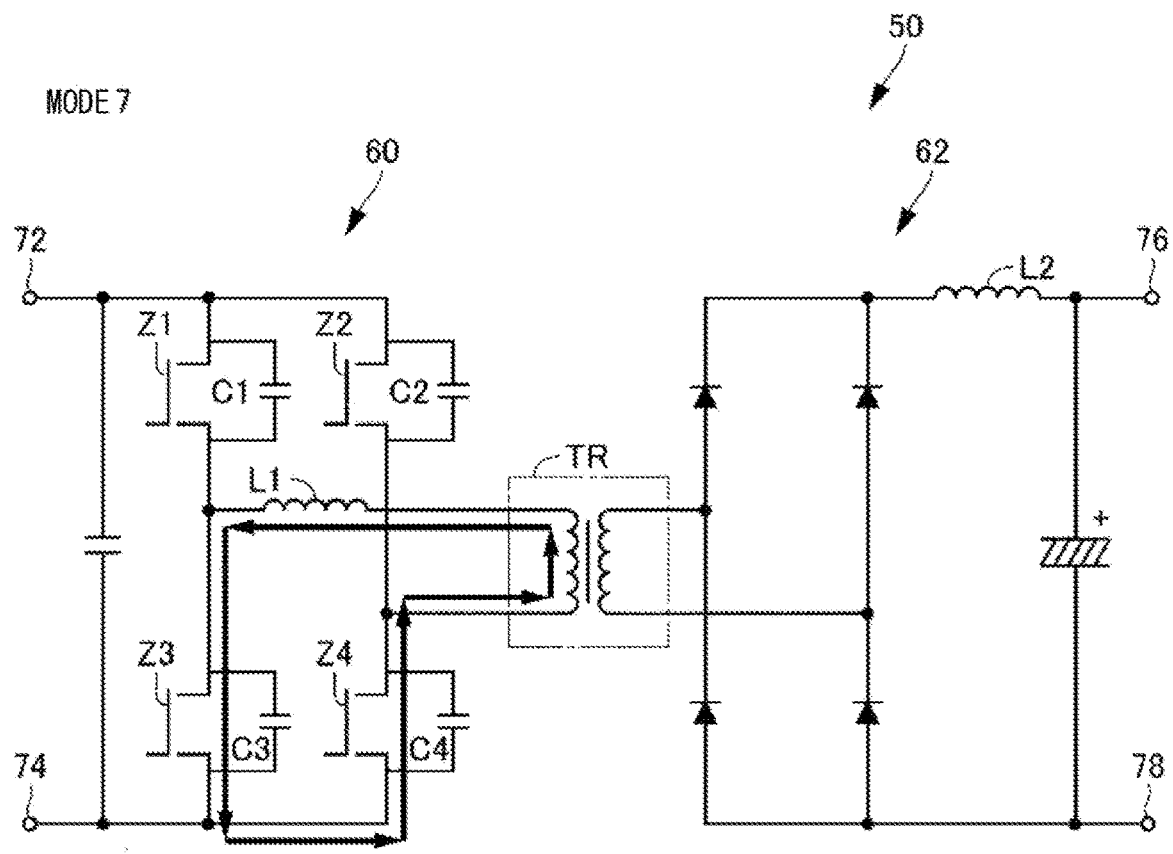
FIG. 14 shows the flow of a current in mode 7 in the DC/DC converter according to the first embodiment of this disclosure.

FIG. 14 shows the current path at this time. With reference to FIG. 14, in mode 7, the current flows through a path of Z4→the primary-side wire of the transformer TR→L1→Z3. At the end of mode 7, Z3 is turned off, and the operation mode enters mode 8.

<<Mode 8>>

Figure 15:
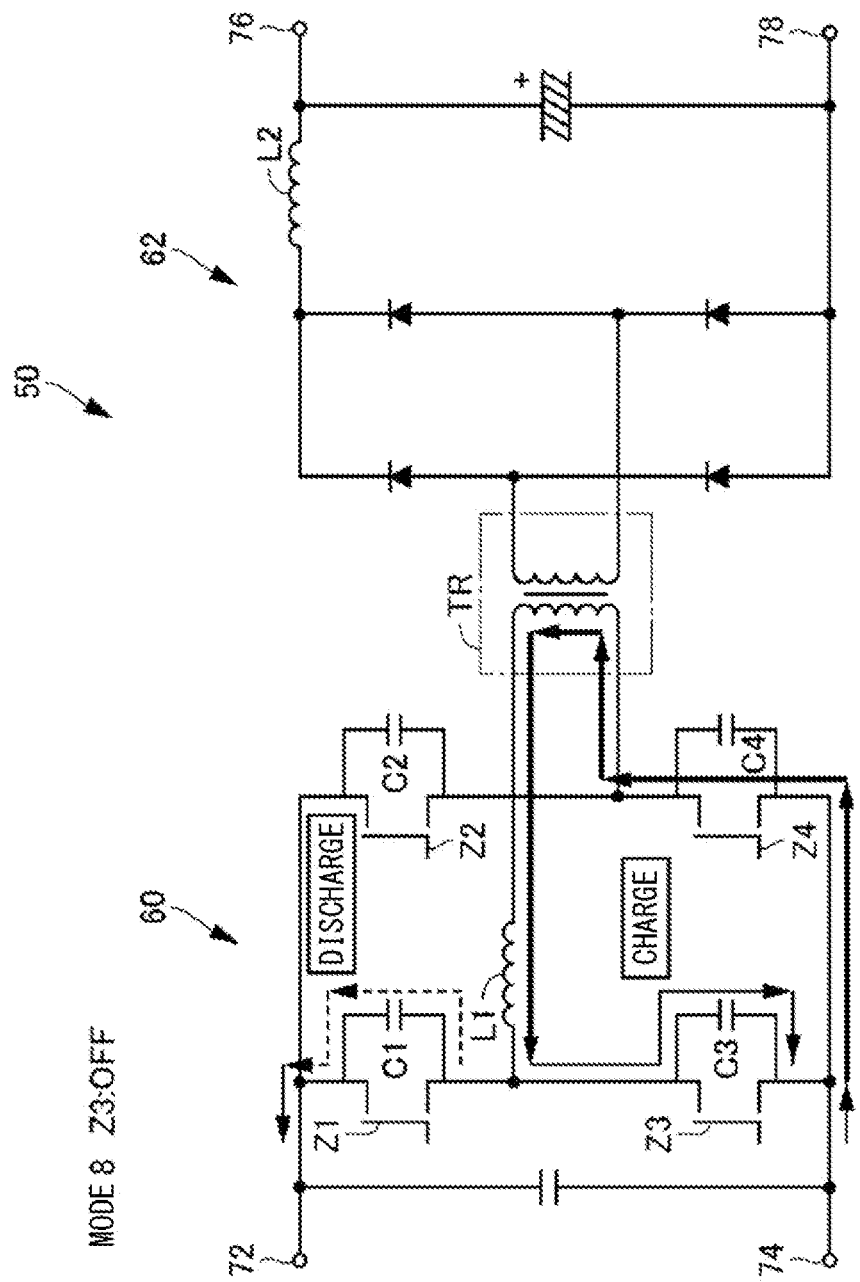
FIG. 15 shows the flow of a current in mode 8 in the DC/DC converter according to the first embodiment of this disclosure.

At the beginning of mode 8, the gate voltages of Z1, Z2, and Z3 are negative voltages, and the gate voltage of Z4 is a positive voltage, as indicated by the drive voltage waveforms 150, 114, 124, and 134 in FIG. 3. Therefore, Z1, Z2, and Z3 are off, and only Z4 is on. As shown in FIG. 15, the current flows through a path of the input terminal 74→Z4→the primary-side wire of the transformer TR→L1, charges C3, and discharges C1. After the discharging of C1, Z1 performs reverse conduction, and the operation mode enters mode 8'.

<<Mode 8'>>

Figure 16:
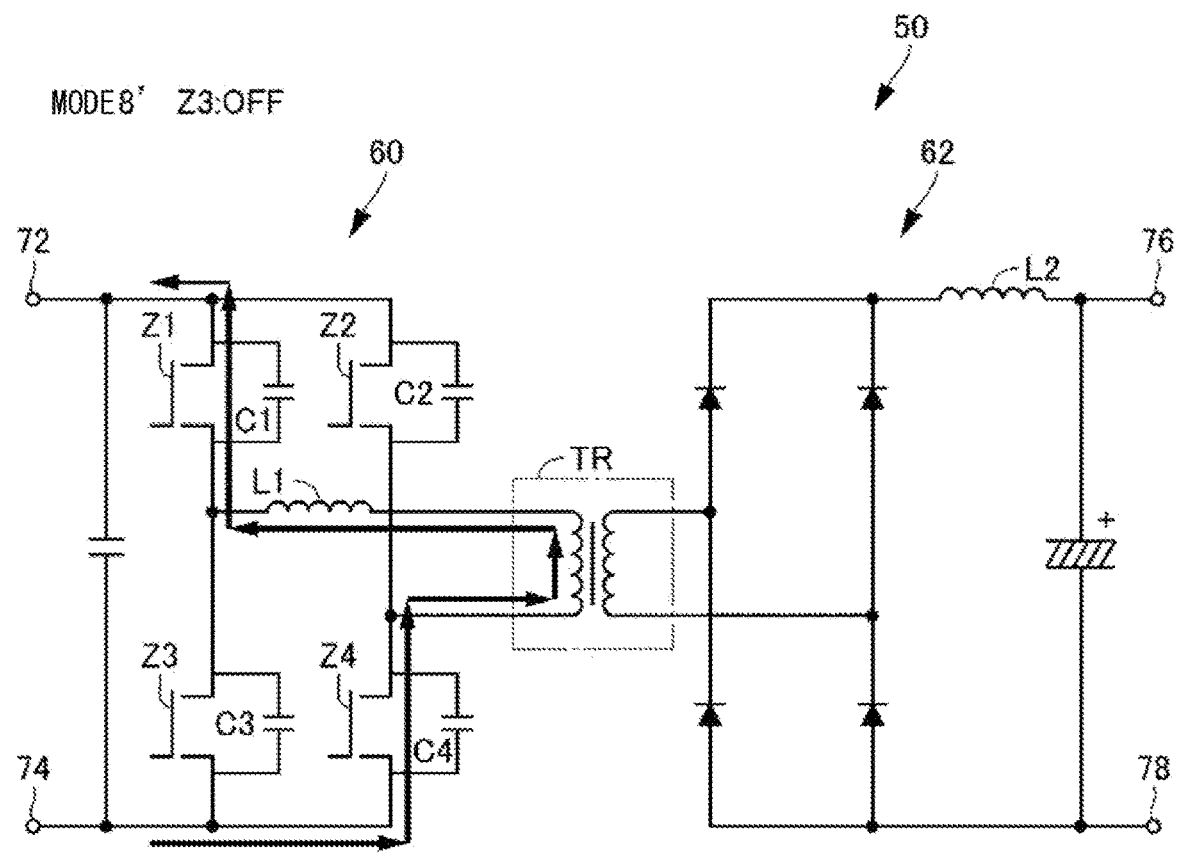
FIG. 16 shows the flow of a current in mode 8' in the DC/DC converter according to the first embodiment of this disclosure.

In mode 8', the gate voltage of Z1 is adjusted to be zero voltage as indicated by a drive voltage waveform 152 in FIG. 3. Accordingly, loss due to the reverse conduction by Z1 can be reduced. At the end of mode 8' (mode 8), the gate voltage of Z1 becomes a positive voltage as indicated by the drive voltage waveform 104 in FIG. 3, and Z1 becomes conductive. FIG. 16 shows the current path at this time.

With reference to FIG. 16, the current flows through a path of the input terminal 74→Z4→the primary-side wire of the transformer TR→L1→Z1→the input terminal 72. At this time, a voltage in a direction reverse to the direction of the current is applied to the primary-side wire of the transformer TR. Therefore, the current is quickly reduced. After a while, the direction of the current becomes the direction as shown in FIG. 4, and the operation mode returns to mode 1.

Thereafter, the operations of mode 1 to mode 8 are repeated.

Figure 17:
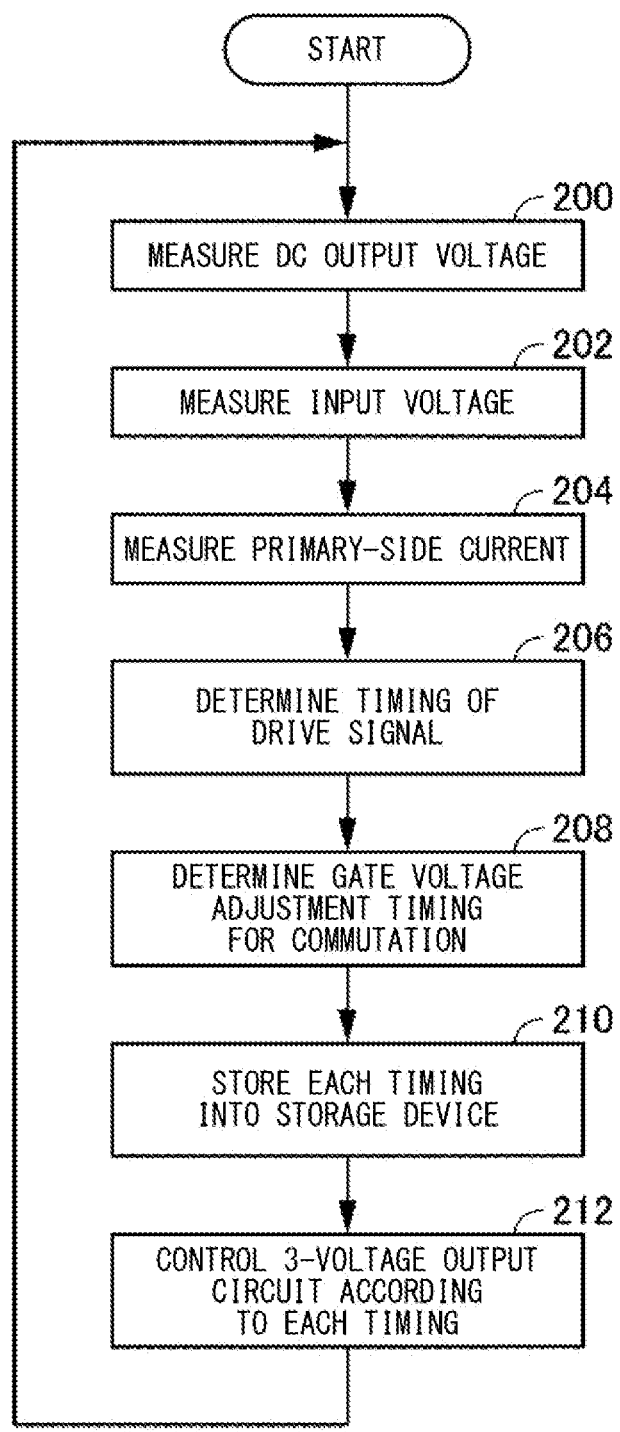
FIG. 17 is a flow chart showing a control structure of a program that controls the gate voltages of GaN devices in the DC/DC converter according to the first embodiment of this disclosure.

FIG. 17 shows, in the form of a flow chart, a control structure of a program executed by the controller 64 for controlling the operation of the phase shift full-bridge DC/DC converter 50. This program adjusts phase shift amounts of on/off of Z1 to Z4 such that a stable DC voltage is outputted between the output terminals 76 and 78, upon reception of outputs of the voltage sensor 66, the current sensor 68, and the voltage sensor 70 shown in FIG. 1, and upon reception of a DC voltage between the input terminals 72 and 74.

With reference to FIG. 17, this program includes: a step 200 of measuring a DC output voltage on the basis of an output of the voltage sensor 70; a step 202 of measuring a DC input voltage on the basis of an output of the voltage sensor 66; and a step 204 of measuring a current flowing in the primary-side wire on the basis of an output of the current sensor 68.

This program further includes: a step 206 of calculating a phase shift amount so as to output a designated DC voltage on the basis of measurement results in steps 200, 202, and 204 and determining timings of turning on/off in mode 1 to mode 8 of Z1, Z2, Z3, and Z4, on the basis of the phase shift amount; a step 208 of determining timings of switching of the gate voltages of Z1 to Z4 to zero voltage as indicated by the drive voltage waveforms 152, 162, 172, and 182 in mode 2', 4', 6' and 8', on the basis of the timings of turning on/off determined in step 206; a step 210 of storing the timings determined in steps 206 and 208 into a storage device (not shown) in the controller 64; and a step 212 of controlling the 3-voltage output circuits 80, 82, 84, and 86 shown in FIG. 1 on the basis of the timings determined in step 206 and 208, and returning the control to step 200.

[Operation]

The phase shift full-bridge DC/DC converter 50 having the above-described configuration operates as follows. With reference to FIG. 17, during operation of the phase shift full-bridge DC/DC converter 50, the controller 64 of the phase shift full-bridge DC/DC converter 50 repeatedly executes the program having the control structure shown in FIG. 17.

That is, the controller 64 measures a DC output voltage on the basis of an output of the voltage sensor 70 in step 200, measures a DC input voltage on the basis of an output of the voltage sensor 66 in step 202, and measures a current flowing in the primary-side wire on the basis of an output of the current sensor 68 in step 204. Further, on the basis of the measurement results in steps 200, 202, and 204, the controller 64 calculates, in step 206, a phase shift amount so as to output a designated DC voltage, and determines timings of turning on/off in mode 1 to mode 8 of Z1, Z2, Z3, and Z4 on the basis of the phase shift amount. On the basis of the timings of turning on/off determined in step 206, the controller 64 determines, in step 208, timings of switching the gate voltages of Z1 to Z4 to zero voltage as indicated by the drive voltage waveforms 152, 162, 172, and 182 in modes 2', 4', 6' and 8'. In the subsequent step 210, the controller 64 stores the timings determined in steps 206 and 208 into the storage device. Then, in step 212, the controller 64 controls the 3-voltage output circuits 80, 82, 84, and 86 shown in FIG. 1 on the basis of the timings determined in steps 206 and 208, to control power supply voltages for Z1 to Z4 at predetermined timings. Upon completion of the control of Z1 to Z4, the controller 64 returns the control to step 200, and performs the processing of the next cycle.

As a result, as already described with reference to FIG. 3, at a timing at which Z2 is turned on from off in a latter half (mode 2') of mode 2, the gate voltage of Z2 is once switched to zero voltage immediately before Z2 is turned on, as indicated by the drive voltage waveform 162, and then, is switched to a positive voltage after a lapse of a predetermined time period. As a result, loss due to reverse conduction by Z2 in this period is reduced. Similarly, at a timing immediately before Z3 is turned on from off in a latter half (mode 4') of mode 4, the gate voltage of Z3 is once switched to zero voltage as indicated by the drive voltage waveform 172, and then, is switched to a positive voltage. As a result, loss due to reverse conduction by Z3 in this period is reduced. Also in the case of Z4, at a timing immediately before Z4 is turned on from off in a latter half (mode 6') of mode 6, the gate voltage is once switched to zero voltage as indicated by the drive voltage waveform 182, and then, is switched to a positive voltage. As a result, loss due to reverse conduction by Z4 in this period is reduced. Further, also with respect to Z1, at a timing immediately before Z1 is turned on from off in the latter half (mode 8') of mode 8, the gate voltage is once switched to zero voltage as indicated by the drive voltage waveform 152, and then, is switched to a positive voltage after a lapse of a predetermined time period. As a result, loss due to reverse conduction by Z1 in this period is reduced.

As described above, according to this embodiment, in an insulated phase shift full-bridge DC/DC converter, when a GaN device performs reverse conduction immediately before the timing at which the gate voltage of the GaN device is changed from a negative voltage to a positive voltage, the gate voltage is once switched from the negative voltage to zero voltage in consideration of the path of the current. The gate voltage is adjusted in this manner to reduce loss due to reverse conduction, and then, the gate voltage is switched to a positive voltage. Therefore, loss due to reverse conduction can be reduced in the insulated DC/DC converter.

Second Embodiment

The timing at which the gate voltage of the GaN device is switched to zero voltage may be back calculated from the timing of the phase shift, and may be any timing that is within an operation mode immediately before the gate voltage of the GaN device is switched from a negative voltage to a positive voltage when performing normal phase shift control. However, in order to obtain a certain effect or more, it is preferable that zero voltage is continually applied to the gate of the GaN device at least for a certain period in the operation mode. For example, preferably, the gate voltage is set to zero voltage before at least 2/3 from the beginning of the operation mode. Further preferably, the gate voltage is switched to zero voltage before 1/2 of the period of the operation mode, and further preferably before 1/3 from the beginning thereof, and zero voltage is preferably maintained to the end of the operation mode.

That is, "immediately before" here means a period from the timing at which a predetermined time period has elapsed after the GaN device had been turned off by setting the gate voltage of the GaN device to a negative voltage to the timing at which the GaN device is next turned on by setting the gate voltage of the GaN device to a positive voltage. In this period, the gate voltage of the GaN device is maintained at an adjustment voltage (zero voltage) between the negative voltage and the positive voltage. Thereafter, at the timing at which the GaN device is driven to be on, the drive voltage of the GaN device is switched to an on-voltage. A second embodiment described below is characterized in that the period in which the drive voltage is maintained at an adjustment voltage is longer than that in the first embodiment.

Figure 18:
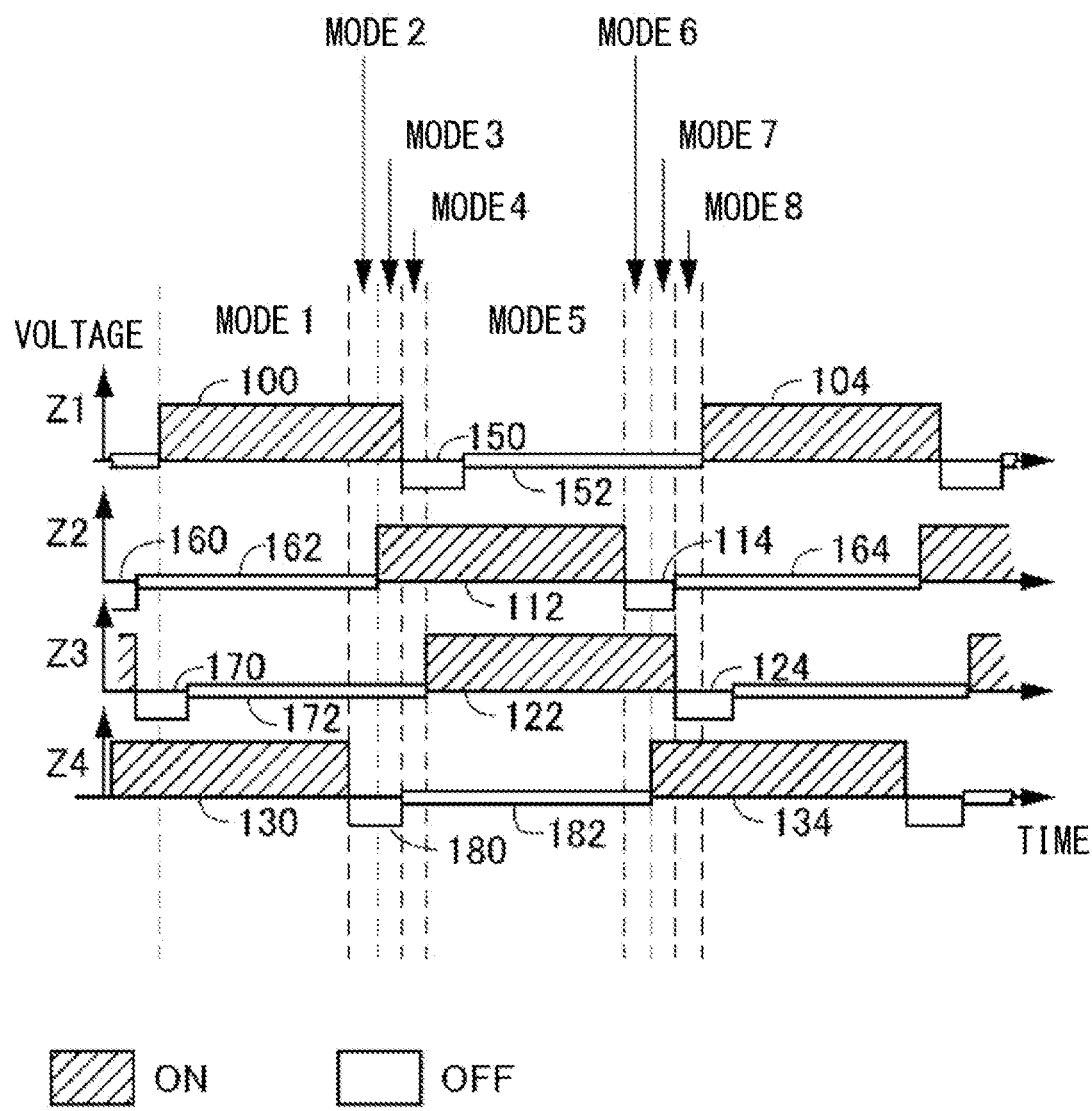
FIG. 18 shows, in time series, change in the gate voltage of each GaN device in the DC/DC converter according to a second embodiment of this disclosure.

FIG. 18 shows drive voltage of Z1, Z2, Z3, and Z4 when the phase shift full-bridge DC/DC converter 50 shown in FIG. 1 is driven according to the second embodiment.

<<Mode 1>>

With reference to FIG. 18, at the time of start of mode 1, Z1 is switched from off to on as indicated by the drive voltage waveform 100. At this time, as indicated by the drive voltage waveform 170, a negative voltage is being applied to Z3 serving as the device (connected in series to Z1) paired with Z1. Therefore, self-turning-on of Z3 associated with change in the drain-source voltage of Z3 can be prevented. As described below, also when Z2, Z3, and Z4 are switched from off to on, a negative voltage is being applied to each of Z4, Z1, and Z2 serving as devices respectively paired with Z2, Z3, and Z4, and self-turning-on of Z4, Z1, and Z2 can be prevented.

Thereafter, in mode 1, the gate voltages of Z1 and Z4 are positive voltages as indicated by the drive voltage waveforms 100 and 130, and Z1 and Z4 are on. Meanwhile, as indicated by the drive voltage waveform 160 and 162, the drive voltage of Z2 has been changed from a negative voltage to zero voltage at the beginning of the immediately before mode (mode 8 described later), and is maintained at zero voltage for the period of mode 1. In addition, as indicated by the drive voltage waveform 170 and 172, the drive voltage of Z3 is a negative voltage at the beginning of mode 1, and is changed to zero voltage after mode 1 is started. Therefore, Z3 is off. In this embodiment, as indicated by the drive voltage waveform 170, the drive voltage of Z3 becomes zero voltage in a relatively short time period after Z3 has been turned off, when compared with the first embodiment. At the end of mode 1, the drive voltage of Z4 is switched to a negative voltage, Z4 is turned off, and mode 2 is started.

<<Mode 2>>

At the beginning of mode 2, Z1 remains on, but Z4 is off. The drive voltages of Z2 and Z3 are maintained at zero voltage. The current path at this time is the same as that shown in FIG. 5. In mode 2, C2 is discharged and C4 is charged. Upon completion of the discharging of C2, the operation mode enters mode 2'.

<<Mode 2'>>

After the discharging of C2, Z2 performs reverse conduction in mode 2', and the current flows through a path of Z1→L1→the primary-side wire of the transformer TR→Z2. At this time, the drive voltage of Z2 is zero voltage as indicated by the drive voltage waveform 162 in FIG. 18, and becomes a positive voltage at the end of mode 2 as indicated by the drive voltage waveform 112. As a result, similar to the first embodiment, the potential difference between the source and the drain of Z2 during the reverse conduction by Z2 is reduced when compared with that during application of a negative voltage to Z2, and loss due to the reverse conduction is reduced.

<<Mode 3>>

In mode 3, Z1 and Z2 are on, and Z4 is off. The drive voltage of Z3 is maintained at zero potential. The current path in mode 3 is the same as that in the first embodiment, and is the current path shown in FIG. 7. At the end of mode 3, the drive voltage of Z1 is switched to a negative voltage as indicated by the drive voltage waveform 150, and Z1 is turned off. In addition, the drive voltage of Z4 is switched from a negative voltage to zero voltage as indicated by the drive voltage waveform 182.

<<Mode 4>>

At the beginning of mode 4, Z1 is off, and Z2 is on. The drive voltages of Z3 and Z4 are each zero voltage. The current path at this time is the same as that in the first embodiment, and is the current path shown in FIG. 8. With reference to FIG. 8, in order to maintain the current flowing in the primary-side wire, C3 is discharged and C1 is charged, whereby the current flows through a path of the drain of Z1→L1→the primary-side wire of the transformer TR→Z2→the input terminal 72. After the discharging of C3, Z3 performs reverse conduction, and a current flows in Z3. As indicated by the drive voltage waveform 172 in FIG. 18, the drive voltage of Z3 is already zero voltage. Accordingly, the operation mode enters mode 4'.

<<Mode 4'>>

In mode 4', a current flows in Z3 due to the reverse conduction. However, since the drive voltage of Z3 is zero voltage and the absolute value of the source-drain voltage is reduced, loss due to the reverse conduction by Z3 can be reduced. The current path in this mode 4' is that shown in FIG. 9, as in the first embodiment. At the end of mode 4', the drive voltage of Z3 is switched to a positive voltage as indicated by the drive voltage waveform 122 in FIG. 18.

<<Mode 5>>

At the beginning of the subsequent mode 5, Z1 is off, and Z2 and Z3 are on. The drive voltage of Z4 is zero voltage. The current path at this time is that shown in FIG. 10 as in the first embodiment. As indicated by the drive voltage waveforms 150 and 152, the drive voltage of Z1 is switched to zero voltage in a short time period from the start of mode 5. In mode 5, the current shown in FIG. 10 is quickly reduced, and the direction of the current is reversed in the same path, as shown in FIG. 11. This is defined as mode 5'. At the end of mode 5 (mode 5'), the drive voltage of Z2 becomes a negative voltage as indicated by the drive voltage waveform 114 in FIG. 18, and Z2 is turned off. As a result, the operation mode enters mode 6.

<<Mode 6>>

In mode 6, Z2 is off and Z3 is on as indicated by the drive voltage waveforms 114 and 122 in FIG. 18. The drive voltages of Z1 and Z4 are each zero voltage as indicated by the drive voltage waveforms 152 and 182. As shown in FIG. 12, in order to maintain the current flowing in the primary-side wire of the transformer TR, as in the first embodiment, the current passes through a path of the input terminal 72→C2→the primary-side wire of the transformer TR→L1→Z3→the input terminal 74, charges C2, and discharges C4. At the time point of completion of the discharging of C4, Z4 performs reverse conduction. At this time, the gate voltage of Z4 is already zero voltage as indicated by the drive voltage waveform 182 in FIG. 18. Accordingly, the operation mode enters operation mode 6'.

<<Mode 6'>>

In mode 6', Z2 is off, Z3 is on, and Z4 is performing reverse conduction. The current flows through a path of Z4→the primary-side wire of the transformer TR→L1→Z3 as shown in FIG. 13. In this mode 6', the gate voltage of Z4 is zero voltage. Therefore, loss due to the reverse conduction by Z4 can be reduced. At the end of mode 6' (mode 6), the gate voltage of Z4 becomes a positive voltage as indicated by the drive voltage waveform 134 in FIG. 18, Z4 is turned on, and the operation mode enters mode 7.

<<Mode 7>>

In mode 7, the gate voltage of Z2 is a negative voltage, and the gate voltages of Z3 and Z4 are each a positive voltage as indicated by the drive voltage waveforms 114, 122, and 134. The drive voltage of Z1 is zero voltage as indicated by the drive voltage waveform 152. Therefore, Z2 is off, and Z3 and Z4 are on.

The current path at this time is that shown in FIG. 14, as in the first embodiment. With reference to FIG. 14, in mode 7, the current flows through a path of Z4→the primary-side wire of the transformer TR→L1→Z3. At the end of mode 7, Z3 is turned off, and mode 8 is started. At the same time, the drive voltage of Z2 becomes zero voltage as indicated by a drive voltage waveform 164.

<<Mode 8>>

At the beginning of mode 8, the gate voltage of Z3 is a negative voltage and the gate voltage of Z4 is a positive voltage, as indicated by the drive voltage waveforms 124 and 134 in FIG. 18. Therefore, Z3 is off, and only Z4 is on. The drive voltages of Z1 and Z2 are each zero voltage. Also in this case, as in the first embodiment, the current flows through a path of the input terminal 74→Z4→the primary-side wire of the transformer TR→L1, charges C3, and discharges C1, as shown in FIG. 15. After the discharging of C1, Z1 performs reverse conduction, and mode 8' is started.

<<Mode 8'>>

In mode 8', the gate voltage of Z1 is already zero voltage as indicated by the drive voltage waveform 152 in FIG. 18. Accordingly, loss due to the reverse conduction by Z1 can be reduced. At the end of mode 8' (mode 8), the gate voltage of Z1 becomes a positive voltage as indicated by the drive voltage waveform 104 in FIG. 18, and Z1 becomes conductive. Thereafter, returning to mode 1, the above operations are repeated.

Thus, in this embodiment, in a period after the drive voltages of Z1, Z2, Z3, and Z4 have each become a negative voltage until the timing at which Z1, Z2, Z3, and Z4 are caused to be conductive after a lapse of a relatively short predetermined time period, the drive voltages of Z1, Z2, Z3, and Z4 are each maintained at zero voltage serving as an adjustment voltage. Also in this case, loss during reverse conduction by Z1, Z2, Z3, and Z4 can be reduced. As a result, the DC/DC converter can be efficiently operated.

In each of the first and second embodiments, zero voltage is preferable as the adjustment voltage. However, in this disclosure, as long as the adjustment voltage is a voltage, near zero voltage, that can substantially reduce power loss due to reverse conduction, the adjustment voltage is not necessarily a complete zero voltage. For example, as the adjustment voltage, any voltage in a range about 0±0.3 V may be adopted.

In the embodiments described above, after the gate voltage of the GaN device has been switched to a negative voltage and maintained for a predetermined time period, the gate voltage is maintained at an adjustment voltage until immediately before the timing at which the gate voltage is switched to a positive voltage, and then, the adjustment voltage is further maintained for a certain period, and then, is switched to a positive voltage. However, this disclosure is not limited to such an embodiment. For example, at the timing at which the device performs reverse conduction, the gate voltage is switched from a negative voltage to an adjustment voltage that is higher than the negative voltage and that is lower than zero voltage. After a lapse of a predetermined time period, the gate voltage may be further switched to zero voltage, and then switched to a positive voltage. That is, the gate voltage may be stepwise changed from a negative voltage toward zero voltage in a plurality of stages, and then, switched to a positive voltage. Also in this case, loss associated with reverse conduction can be reduced.

This disclosure is not necessarily only applicable to a phase shift full-bridge DC/DC converter as in the embodiments described above. This disclosure is also applicable to an insulated converter similarly adopting a full bridge, e.g., an LLC resonance circuit.

In the embodiments described above, the GaN device is used for switching. Since the GaN device has a low threshold at which the GaN device is turned on, the gate voltage needs to be a negative voltage in a period in which the GaN device is caused to be off, as described above. Therefore, loss caused when the GaN device performs reverse conduction tends to be increased. However, this disclosure is not necessarily only applicable to the GaN device. This disclosure is also applicable to a device that will be developed in the future, as long as the device has a low threshold voltage similar to the GaN device, has a source and a drain arranged in symmetry with each other, and has a possibility of performing reverse conduction.

Further, this disclosure can be realized not only as a power conversion apparatus including such a characteristic controller 64, but also as a power conversion method or a semiconductor switch driving method having such characteristic processes as steps, or as a program for causing a computer to execute such steps. In addition, this disclosure can be realized as a semiconductor integrated circuit realizing a part or the entirety of the power conversion apparatus, or as a power conversion system including the power conversion apparatus.

[Vehicle]

Figure 19:
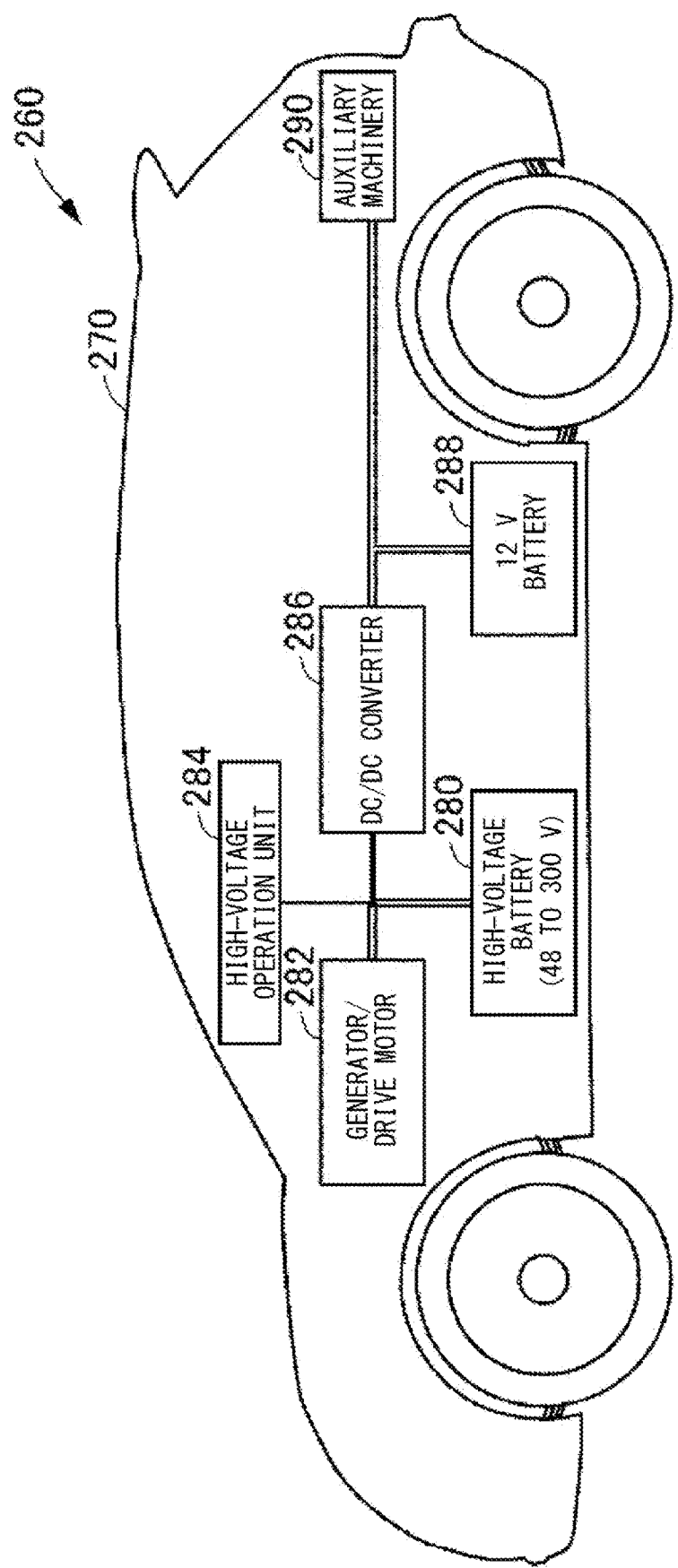
FIG. 19 is a schematic diagram showing an electric configuration of a vehicle having installed therein a power conversion circuit of the DC/DC converter according to the first or second embodiment of this disclosure.

FIG. 19 shows a schematic configuration of a vehicle having installed therein the power conversion apparatus including the DC/DC converter according to the embodiments described above. With reference to FIG. 19, this vehicle 260 includes: a vehicle body 270 having a basic configuration as a vehicle; a high-voltage battery 280 serving as a high-voltage power supply (e.g., 48 to 300 V) provided to the vehicle body 270; a generator/drive motor 282 which operates using power supplied from the high-voltage battery 280, the generator/drive motor 282 being for providing a driving force of the vehicle body 270 and for converting, into power, kinetic energy lost by the vehicle 260 at the time of braking of the vehicle 260 and supplying the power to the high-voltage battery 280; a high-voltage operation unit 284 which operates using a high DC voltage supplied from the high-voltage battery 280; a low-voltage (e.g., 12 V) battery 288; an auxiliary machinery 290 which operates using a low voltage power supplied from the battery 288; and a DC/DC converter 286 for stepping down a high-voltage DC power supplied from the high-voltage battery 280 to, for example, 12 V, and for supplying the resultant power to the battery 288, the auxiliary machinery 290, and the like. The auxiliary machinery 290 receives power not only from the battery 288 but also from the DC/DC converter 286.

As the DC/DC converter 286, the phase shift full-bridge DC/DC converter 50 described in the above embodiments is used. Therefore, in this vehicle, power loss at the time of power conversion is small, and the auxiliary machinery can be operated effectively using power stored in the high-voltage battery 280. Instead of the phase shift full-bridge DC/DC converter 50, the DC/DC converter according to the second embodiment described above may be used.

The embodiments disclosed herein are merely illustrative in all aspects and should be considered not restrictive. The scope of this disclosure is defined by the scope of the claims rather than the detailed description of the disclosure, and is intended to include meaning equivalent to the scope of the claims and all modifications within the scope.

REFERENCE SIGNS LIST

C0, C5 capacitor
C1, C2, C3, C4 parasitic capacitance
D1, D2, D3, D4 diode
L1, L2 leakage inductance
TR transformer
Z1, Z2, Z3, Z4 GaN-HEMT
50 phase shift full-bridge DC/DC converter
60 primary-side portion
62 secondary-side portion
64 controller
66, 70 voltage sensor
68 current sensor
72, 74 input terminal
76, 78 output terminal
80, 82, 84, 86 3-voltage output circuit
100, 102, 104, 110, 112, 114, 120, 122, 124, 130, 132, 134, 150, 152, 160, 162, 164, 170, 172, 180, 182 drive voltage waveform
200, 202, 204, 206, 208, 210, 212 step
260 vehicle
270 vehicle body
280 high-voltage battery
282 generator/drive motor
284 high-voltage operation unit
286 DC/DC converter
288 battery
290 auxiliary machinery

The invention claimed is:

1. A semiconductor switch driving apparatus configured to drive a semiconductor switch, the semiconductor switch not having a body diode and having a threshold voltage for performing switching between off and on lower than a threshold voltage of a silicon device, the semiconductor switch driving apparatus comprising:
a controller adapted to drive the semiconductor switch, the controller creating:
a first mode to switch a drive voltage of the semiconductor switch to a first adjustment voltage between an off-voltage and an on-voltage, at a predetermined time immediately before a timing at which the semiconductor switch is driven from off to on; and
a second mode to switch, after the drive voltage of the semiconductor switch has been switched by the first mode, the drive voltage of the semiconductor switch to the on-voltage at the timing at which the semiconductor switch is driven from off to on.

2. The semiconductor switch driving apparatus according to claim 1, wherein
the off-voltage is a negative voltage,
the on-voltage is a positive voltage, and
the first adjustment voltage is higher than the off-voltage and not higher than the threshold voltage.

3. The semiconductor switch driving apparatus according to claim 1, wherein
the first adjustment voltage is zero voltage.

4. The semiconductor switch driving apparatus according to claim 1, wherein
the semiconductor switch is a semiconductor switch forming a phase shift full-bridge circuit.

5. The semiconductor switch driving apparatus according to claim 4, wherein
the phase shift full-bridge circuit includes four of the semiconductor switches, and
the semiconductor switch driving apparatus drives each of the four semiconductor switches.

6. The semiconductor switch driving apparatus according to claim 1, wherein
the controller creates a third mode to switch, after the predetermined time and before the timing, the drive voltage of the semiconductor switch to a second adjustment voltage higher than the first adjustment voltage and lower than the on-voltage.

7. The semiconductor switch driving apparatus according to claim 1, wherein
the semiconductor switch is a gallium nitride switch.

8. The semiconductor switch driving apparatus according to claim 2, wherein
the first adjustment voltage is zero voltage.

9. The semiconductor switch driving apparatus according to claim 2, wherein
the semiconductor switch is a semiconductor switch forming a phase shift full bridge circuit.

10. The semiconductor switch driving apparatus according to claim 3, wherein
the semiconductor switch is a semiconductor switch forming a phase shift full bridge circuit.

11. The semiconductor switch driving apparatus according to claim 8, wherein the semiconductor switch is a semiconductor switch forming a phase shift full bridge circuit.

12. A semiconductor switch driving apparatus configured to drive a semiconductor switch, the semiconductor switch not having a body diode and having a threshold voltage for performing switching between off and on lower than a threshold voltage of a silicon device, the semiconductor switch driving apparatus comprising:

a controller adapted to drive the semiconductor switch, the controller creating:

a first mode to switch a drive voltage of the semiconductor switch to a first adjustment voltage between an off-voltage and an on-voltage, after a lapse of a predetermined time period after the semiconductor switch has been turned off until a timing at which the semiconductor switch is next driven to be on; and a second mode to switch, after the drive voltage of the semiconductor switch has been switched by the first mode, the drive voltage of the semiconductor switch to the on-voltage at the timing at which the semiconductor switch is driven to be on.

13. A power conversion apparatus configured to output a power obtained by conversion of an inputted power through switching of a plurality of semiconductor switches, the power conversion apparatus comprising:

a power conversion circuit including a plurality of semiconductor switch elements, an inductance element, a transformer, and a capacitance element which are connected so as to realize the conversion; and the semiconductor switch driving apparatus according to claim 1 configured to drive at least one of the plurality of semiconductor switch elements of the power conversion circuit.

14. A vehicle comprising:

a vehicle body;

a battery provided to the vehicle body and configured to store power at a first voltage and output the power;

a low-voltage operation unit provided to the vehicle body and configured to operate at a second voltage lower than the first voltage; and the power conversion apparatus according to claim 13 provided to the vehicle body and configured to receive the output of the battery as an input, convert the output so as to have the second voltage, and supply the resultant output to the low-voltage operation unit.

15. A power conversion apparatus configured to output a power obtained by conversion of an inputted power through switching of a plurality of semiconductor switches, the power conversion apparatus comprising:

a power conversion circuit including a plurality of semiconductor switch elements, an inductance element, a transformer, and a capacitance element which are connected so as to realize the conversion; and the semiconductor switch driving apparatus according to claim 12 configured to drive at least one of the plurality of semiconductor switch elements of the power conversion circuit.

16. A driving method for a semiconductor switch, the semiconductor switch not having a body diode and having a threshold voltage for performing switching between off and on lower than a threshold voltage of a silicon device, the driving method comprising the steps of:

switching a drive voltage of the semiconductor switch to a first adjustment voltage between an off-voltage and an on-voltage at a predetermined time immediately before a timing at which the semiconductor switch is driven from off to on; and switching, after the drive voltage of the semiconductor switch has been switched to the first adjustment voltage, the drive voltage of the semiconductor switch to the on-voltage at the timing at which the semiconductor switch is driven from off to on.

* * * * *